United States Patent
Chang et al.

(10) Patent No.: US 9,380,304 B1
(45) Date of Patent: Jun. 28, 2016

(54) CELL-BASED COMPRESSION WITH EDGE DETECTION

(71) Applicant: KYOCERA Document Solutions Inc., Osaka (JP)

(72) Inventors: Michael M. Chang, El Segundo, CA (US); Kenneth A. Schmidt, El Segundo, CA (US); Dongpei Su, El Segundo, CA (US); Sheng Li, El Segundo, CA (US); Kendrick Wong, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/610,101

(22) Filed: Jan. 30, 2015

(51) Int. Cl.
| | |
|---|---|
| *G06F 15/00* | (2006.01) |
| *H04N 19/103* | (2014.01) |
| *H04N 1/00* | (2006.01) |
| *H04N 1/21* | (2006.01) |
| *H04N 19/119* | (2014.01) |
| *H04N 19/132* | (2014.01) |
| *H04N 19/136* | (2014.01) |
| *H04N 19/17* | (2014.01) |
| *H04N 19/60* | (2014.01) |

(52) U.S. Cl.
CPC ......... *H04N 19/103* (2014.11); *H04N 1/00005* (2013.01); *H04N 1/21* (2013.01); *H04N 19/119* (2014.11); *H04N 19/132* (2014.11); *H04N 19/136* (2014.11); *H04N 19/17* (2014.11); *H04N 19/60* (2014.11); *H04N 2201/0094* (2013.01)

(58) Field of Classification Search
None
See application file for complete search history.

(56) References Cited

U.S. PATENT DOCUMENTS

| | | | |
|---|---|---|---|
| 5,524,067 A | 6/1996 | Miyake et al. | |
| 5,742,704 A | 4/1998 | Suzuki et al. | |
| 5,915,079 A | 6/1999 | Vondran, Jr. et al. | |
| 6,125,201 A * | 9/2000 | Zador | 382/166 |
| 6,266,150 B1 * | 7/2001 | Brossman | G06F 3/1205 358/1.12 |
| 6,285,458 B1 | 9/2001 | Yada | |
| 6,515,756 B1 * | 2/2003 | Mastie | G06F 3/1205 358/1.15 |
| 6,529,633 B1 | 3/2003 | Easwar et al. | |
| 7,352,490 B1 * | 4/2008 | Tse et al. | 358/1.9 |
| 7,751,633 B1 | 7/2010 | Mukherjee | |

(Continued)

FOREIGN PATENT DOCUMENTS

EP  0856988  8/1998

OTHER PUBLICATIONS

Extended European Search Report and Opinion for App. No. EP 13171543.5, mailed Mar. 5, 2014, 7 pages.

(Continued)

*Primary Examiner* — Steven Kau
(74) *Attorney, Agent, or Firm* — McDonnell Boehnen Hulbert & Berghoff LLP

(57) ABSTRACT

An example embodiment may involve obtaining an a×b pixel macro-cell from an input image. Pixels in the a×b pixel macro-cell may have respective pixel values and may be associated with respective tags. It may be determined whether at least e of the respective tags indicate that their associated pixels represent edges in the input image. Based on this determination, either a first encoding or a second encoding of the a×b pixel macro-cell may be selected. The first encoding may weigh pixels that represent edges in the input image heavier than pixels that do not represent edges in the input image, and the second encoding might not consider whether pixels represent edges. The selected encoding may be performed and written to a computer-readable output medium.

9 Claims, 15 Drawing Sheets

(56) References Cited

U.S. PATENT DOCUMENTS

| | | | |
|---|---|---|---|
| 8,218,908 B2* | 7/2012 | Ilbery | 382/299 |
| 8,422,778 B2* | 4/2013 | Matsuoka | H04N 1/4092 382/166 |
| 8,508,449 B2 | 8/2013 | Broughton et al. | |
| 8,805,069 B2 | 8/2014 | Li et al. | |
| 8,983,185 B2* | 3/2015 | Deng et al. | 382/166 |
| 2005/0078754 A1* | 4/2005 | Liang et al. | 375/240.18 |
| 2005/0213125 A1 | 9/2005 | Smith et al. | |
| 2007/0201751 A1 | 8/2007 | Wu et al. | |
| 2012/0154420 A1 | 6/2012 | Calandrino et al. | |
| 2013/0329237 A1* | 12/2013 | Li et al. | 358/1.9 |
| 2013/0329995 A1 | 12/2013 | Webb et al. | |

OTHER PUBLICATIONS

"JPEG," from Wikipedia, en.wikipedia.org/wiki/JPEG accessed Jul. 31, 2012, pp. 1-16.

"YCbCr," from Wikipedia, en.wikipedia.org/wiki/YCbCr accessed Jul. 31, 2012, pp. 1-5.

* cited by examiner

CELL-BASED COMPRESSION WITH EDGE DETECTION

BACKGROUND

In recent years, various types of printing devices have become popular for both business and consumer use. In addition to traditional black and white printers, color printers, scanners, copiers, fax machines, and other components are now common. Multi-function peripherals (MFPs), that support two or more of these operations, are also widely available. As these devices have grown more prevalent, they are being used for processing of more sophisticated and complicated documents.

SUMMARY

A first example embodiment may involve obtaining a×b pixel macro-cells for each of a luminance plane, a first color plane, and a second color plane of an input image. The a×b pixel macro-cells may each contain 4 non-overlapping m×n pixel cells, and pixels in the a×b pixel macro-cells may have respective pixel values. The first example embodiment may also involve determining whether at least e pixels in the a×b pixel macro-cells represent edges in the input image, where e is at least 1. The first example embodiment may further involve, possibly based on whether at least e pixels in the a×b pixel macro-cells represent edges in the input image, selecting either a first encoding or a second encoding of the a×b pixel macro-cells. The first encoding may weigh some pixels that represent edges in the input image heavier than pixels that do not represent edges in the input image, and the second encoding might not consider whether pixels represent edges in the input image. The first example embodiment may additionally involve performing the selected encoding, and writing a representation of the selected encoding, as performed, to a computer-readable output medium.

A second example embodiment may involve obtaining an a×b pixel macro-cell from an input image. Pixels in the a×b pixel macro-cell may have respective pixel values and may be associated with respective tags. The second example embodiment may also involve determining whether at least e of the respective tags indicate that their associated pixels represent edges in the input image, where e is at least 1. The second example embodiment may further involve, possibly based on whether at least e of the respective tags indicate that their associated pixels represent edges in the input image, selecting either a first encoding or a second encoding of the a×b pixel macro-cell. The first encoding may weigh pixels that represent edges in the input image heavier than pixels that do not represent edges in the input image, and the second encoding might not consider whether pixels represent edges. The second example embodiment may additionally involve performing the selected encoding, and writing a representation of the selected encoding, as performed, to a computer-readable output medium.

A third example embodiment may involve obtaining (i) an a×b attribute macro-cell, and (ii) a×b pixel macro-cells for each of a luminance plane, a first color plane, and a second color plane of an input image. The a×b pixel macro-cells may each contain 4 non-overlapping m×n pixel cells, and the a×b pixels in the a×b pixel macro-cells may have respective pixel values. Elements of the a×b attribute macro-cell may be associated in a one-to-one fashion with respective pixels in each of the a×b pixel macro-cells. The third example embodiment may also involve determining 4 attribute-plane output values that respectively represent the 4 non-overlapping m×n attribute cells. The third example embodiment may further involve, possibly based on whether the a×b attribute macro-cell indicates that at least e pixels in the a×b pixel macro-cells represent edges in the input image, determining 1 to 4 luminance-plane output values that represent the a×b pixel macro-cell of the luminance plane, where e is at least 1. The third example embodiment may additionally involve determining a first color-plane output value to represent the a×b pixel macro-cell of the first color plane and a second color-plane output value to represent the a×b pixel macro-cell of the second color plane. The third example embodiment may also involve writing an interleaved representation of the 4 attribute-plane output values, the 1 to 4 luminance-plane output values, the first color-plane output value, and the second color-plane output value to a computer-readable output medium.

A fourth example embodiment may include a non-transitory, computer-readable storage medium, having stored thereon program instructions that, upon execution by a computing device, cause the computing device to perform operations in accordance with the first, second, and/or third example embodiments.

A fifth example embodiment may include a computing device containing at least a processor and data storage. The data storage may include program instructions that, when executed by the processor, cause the computing device to perform operations in accordance with the first, second, and/or third example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11A depicts cells of four planes, according to example embodiments.

FIG. 11B depicts the cells of FIG. 11A interleaved on an output medium, according to example embodiments.

DETAILED DESCRIPTION OF THE DRAWINGS

Figure 1:
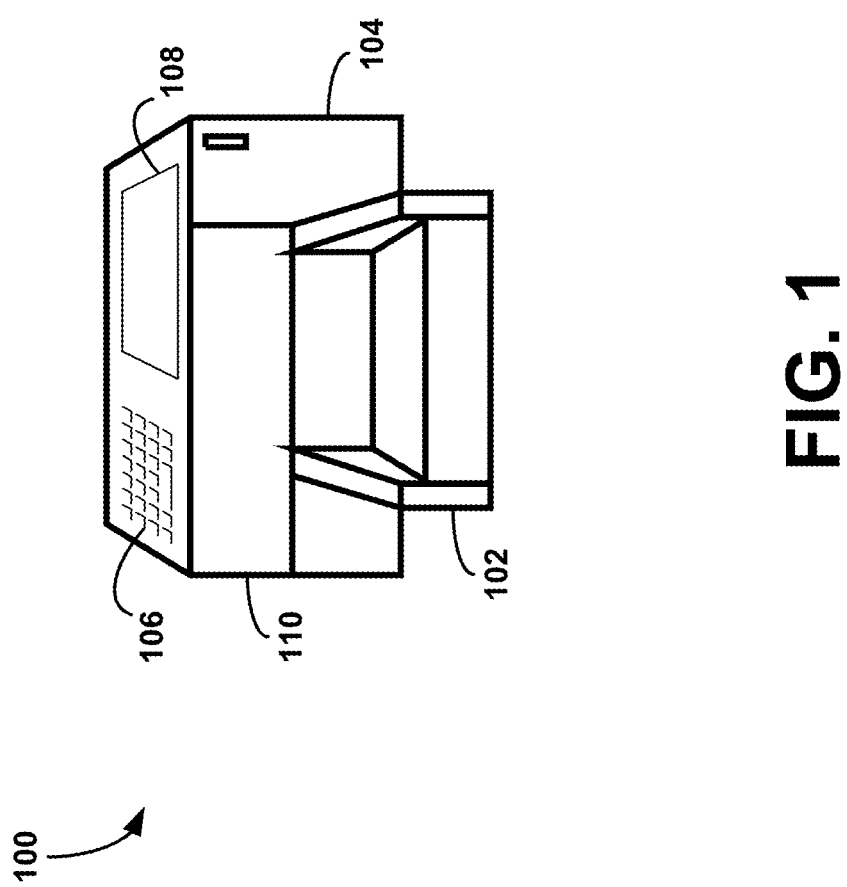
FIG. 1 depicts a printing device, according to example embodiments.

Example methods and systems are described herein. Other example embodiments or features may further be utilized, and other changes may be made, without departing from the scope of the subject matter presented herein. In the following detailed description, reference is made to the accompanying figures, which form a part thereof.

The example embodiments described herein are not meant to be limiting. Thus, aspects of the present disclosure, as generally described herein and illustrated in the figures, can be arranged, substituted, combined, separated, and designed in a wide variety of different configurations, all of which are explicitly contemplated herein.

1. Introduction

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

Regardless of whether a printing device is used in a residence, a business, or in another type of location, the printing device may be a shared resource that can be communicatively coupled to various other computing devices. Consequently, in some environments, the storage requirements of a printing device may be quite high, as numerous computing devices may be transmitting electronic documents to the printing device for printing. Typically, a printing device will print, copy, fax, and/or scan one electronic document at a time, in a first-come-first-served fashion. Therefore, the printing device may store a potentially large number of electronic documents that are waiting to be serviced. Additionally, some electronic documents, such as overlay documents containing background images or logos, may be stored in a printing device indefinitely, as these electronic documents may be applied to multiple print jobs.

Since the cost of data storage (e.g., memory such as random access memory (RAM), solid-state memory, hard-drive memory, and/or flash memory) can be expensive, it may be beneficial to compress the stored electronic documents, in order to reduce the data storage requirements of the printing device. Additionally, since some electronic documents may be transferred to and/or from the printing device and a computing device, compressing these electronic documents may make transfers faster and use less network capacity.

Moreover, since print jobs may be large (e.g., a print job may include one or more electronic documents encompassing hundreds of pages), compressing queued print jobs saves short-term storage space before each job is printed. In addition, users may want to save print jobs in long-term storage for printing at a later time. Thus, compressing print jobs may allow more print jobs to be saved. Furthermore, the act of storing and retrieving large print jobs from long-term memory can be slow, but it may be expedited by compressing the print jobs to make them smaller in size.

2. Example Printing Device

FIG. 1 depicts an example printing device 100. Printing device 100 may be configured to print partially-stored and/or fully-stored electronic documents on various types of physical output media. These output media include, but are not limited to, various sizes and types of paper, overhead transparencies, and so on. Printing device 100 may be interchangeably referred to as a "printer."

Printing device 100 may serve as local peripheral to a computing device, such as a personal computer, a server device, a print server, etc. In these cases, printing device 100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 100.

On the other hand, printing device 100 may include a wireline or wireless network interface, such as an Ethernet or 802.11 (Wifi) interface. So arranged, printing device 100 may serve as a printing device for any number of computing devices that can communicate with printing device 100 over a network. In some embodiments, printing device 100 may serve as both a local peripheral and a networked printer at the same time. In order to use printing device 100, computing devices may install one or more printer drivers. These printer drivers may include software components that convert the electronic documents to be printed from various local representations stored on the computing devices to one or more representations supported by printing device 100.

Regardless, printing device 100 may be considered to be a non-generic type of computing device, and may carry out both printing-related and non-printing related tasks. For instance, printing device 100 may also include copier, fax, and scanner functions. In some embodiments, printing device 100 may use a scanning unit to facilitate copier and/or fax functions. For instance, printing device 100 may scan a physical document into an electronic format, and then print the resulting electronic document to provide a copy, and/or transmit the resulting electronic document via a telephone interface to provide a fax operation. Additionally, printing device 100 may be able to receive a faxed electronic document via a telephone interface, and then compress and store a representation of this electronic document.

In order to support its various capabilities, printing device 100 may include a document feeder/output tray 102, paper storage 104, user interface 106, scanning element 108, and chassis 110. It should be understood that printing devices may take on a wide variety of forms. Therefore printing device 100 may include more or fewer components than depicted in FIG. 1, and/or components arranged in a different fashion than depicted in FIG. 1.

Document feeder/output tray 102 may hold physical documents (e.g., a stack of one or more sheets of paper) that are to be scanned, copied or faxed. Advantageously, document feeder/output tray 102 may allow printing device 100 to automatically feed multiple physical documents for processing by printing device 100 without requiring manual intervention. Document feeder/output tray 102 may also include one or more separate output trays for holding physical documents that have been processed by printing device 100. These may include physical documents that have been scanned, copied or faxed by printing device 100, as well as physical documents that have been produced by, e.g., the fax and/or copying functions of printing device 100.

Paper storage 104 may include trays and/or feeding elements for various types of physical media. For instance, paper storage 104 may include separate trays for 8.5×11 inch paper, A4 paper, letterhead paper, envelopes, and so on. For any operation of printing device 100 that involves outputting physical media (e.g., printing, copying, and/or receiving a fax), paper storage 104 may supply the physical media.

User interface 106 may facilitate the interaction of printing device 100 with a human or non-human user, such as to receive input from a user and to provide output to the user. Thus, user interface 106 may include input components such as a keypad, keyboard, touch-sensitive or presence-sensitive panel, joystick, microphone, still camera and/or video camera. User interface 106 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 106 may also be configured to be able to generate audible output(s), via a speaker, speaker jack, audio output port, audio output device, earphones, and/or other similar devices, now known or later developed in the future.

Scanning element 108 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with printing device 100.

Chassis 110 may include a physical housing that contains and or interconnects various components of printing device 100, such as document feeder/output tray 102, paper storage 104, user interface 106, and scanning element 108. Additionally, chassis 110 may house other components not shown in FIG. 1. For example, chassis 110 may contain one or more toner cartridges, liquid ink jets, belts, rollers, and/or power supplies. Further, chassis 110 may include communication interfaces, such as a wireline and/or wireless network interfaces, a telephony interface (e.g., a RJ45 jack), a USB interface, a BLUETOOTH® interface, a card reader port, etc.

Figure 2:
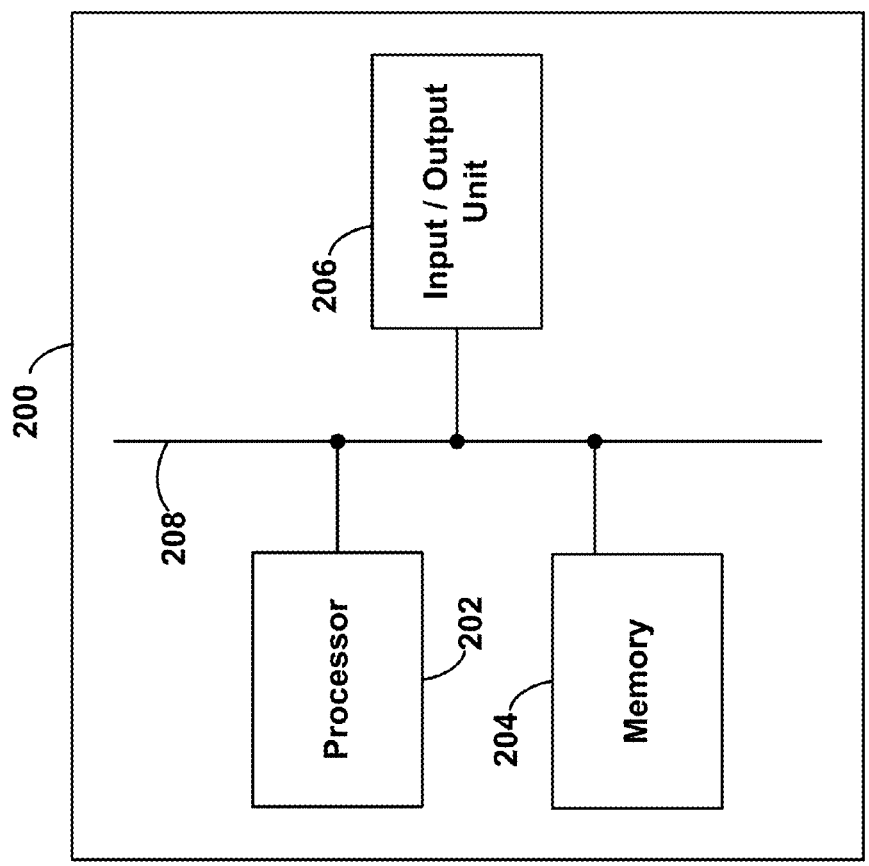
FIG. 2 is a block diagram illustrating computing components of a printing device, according to example embodiments.

Moreover, as printing device 100 may be based on general-purpose and/or specially-designed computing device components, chassis 110 may also house some or all of these components. To that point, FIG. 2 depicts an example embodiment 200 of computing device components (e.g., functional elements of a computing device) that may be included in printing device 100.

Computing device components 200 may include a processor 202, memory 204, and input/output unit 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Memory 204, in turn, may comprise volatile and/or non-volatile data storage and can be integrated in whole or in part with processor 202. Memory 204 may store program instructions, executable by processor 202, and data that are manipulated by these instructions to carry out the various methods, processes, or functions described herein. Alternatively, these methods, processes, or operations can be defined by hardware, firmware, and/or any combination of hardware, firmware and software. Therefore, memory 204 may include a tangible, non-transitory computer-readable medium, having stored thereon program instructions that, upon execution by one or more processors, cause printing device 100 to carry out any of the methods, processes, or functions disclosed in this specification or the accompanying drawings.

Memory 204 may also be configured to store compressed and non-compressed electronic documents that may later be processed (e.g., printed). Thus, memory 204 may serve as an output medium for these electronic documents.

Input/output unit 206 may include any of the operations and/or elements described in reference to user interface 106. Thus, input/output unit 206 may serve to configure and/or control the operation of processor 202. Input/output unit 206 may also provide output based on the operations performed by processor 202.

These examples of a printing device are provided for illustrative purposes. In addition to and/or alternatively to the examples above, other combinations and/or sub-combinations of printer and computer technologies may also exist, amongst other possibilities, without departing from the scope of the embodiments herein.

Figure 3:
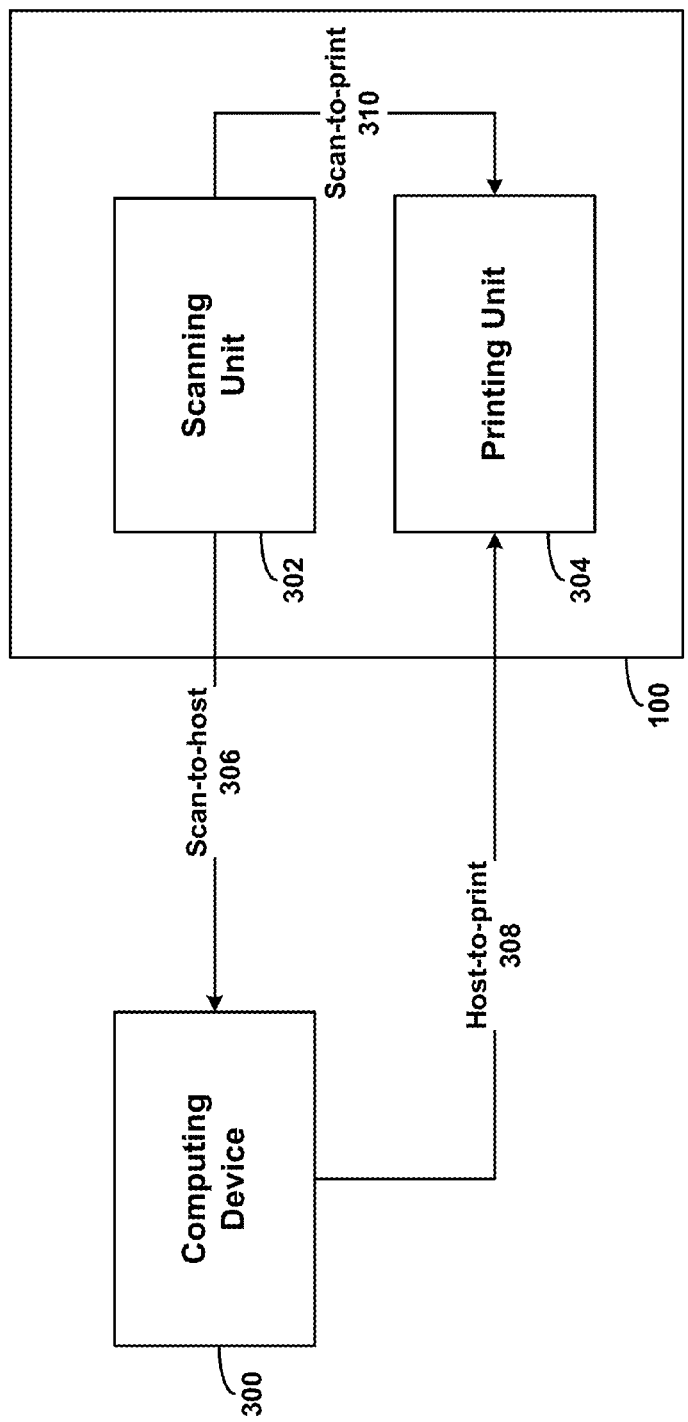
FIG. 3 is a block diagram illustrating various data paths involving a printing device, according to example embodiments.

FIG. 3 depicts some of the possible data paths through which a representation of an electronic document processed by printing device 100 may pass. In FIG. 3 it is assumed that printing device 100 may include a scanning unit 302 and a printing unit 304. Control of each of these units may be implemented in hardware, firmware, software, or any combination of hardware, firmware and/or software. Additionally, each of scanning unit 302 and printing unit 304 may communicate with computing device 300, and possibly with other computing devices as well. In some situations, the data paths supported by printing device 100 may be referred to a "pipelines."

A scan-to-print data path 310 may be supported by scanning unit 302 and printing unit 304. Scan-to-print data path 310 may be used, e.g., when a user instructs printing device 100 to copy a physical document. In response to this instruction, scanning unit 302 may scan the physical document into an electronic document, and transmit the electronic document via scan-to-print data path 310 to printing unit 304. Use of scan-to-print data path 310 may involve at least temporarily storing some or all of the electronic document (possibly in a compressed format) in the data storage of printing device 100. Then, printing unit 304 may print the electronic document to physical media (e.g., one or more sheets of paper).

A scan-to-host data path 306 may also be supported by scanning unit 302 and computing device 300. Scan-to-host data path 306 may be used, e.g., when a user instructs printing device 100 to scan a physical document. The user may also instruct printing device 100 to transmit a representation of the resulting electronic document to computing device 300, or printing device 100 may be pre-configured to automatically transmit the electronic document to computing device 300. Thus, in response to this instruction, scanning unit 302 may scan the physical document into an electronic document, and transmit the resulting electronic document via scan-to-host data path 306 to computing device 300. Use of scan-to-print data path 310 may involve at least temporarily storing (possibly in a compressed format) some or all of the electronic document in the data storage of printing device 100, and transmitting a representation of the resulting electronic document to computing device 300.

A host-to-print data path 308 may be supported by computing device 300 and printing unit 304. Host-to-print data path 308 may be used, e.g., when a user instructs computing device 300 to print an electronic document on printing device 100. In response to this instruction, computing device 300 may transmit a representation of the electronic document to printing unit 304. Printing device 100, via printing unit 304, may print the electronic document to physical media. Some, or all, of the electronic document may be stored (possibly in a compressed format) in the data storage of printing device 100 before and/or during the printing of the electronic document.

Clearly, for at least one of the data paths discussed above, as well as possibly other data paths supported by printing device 100, an electronic document may require storage and/or transmission over a network or a cable. The efficiency of both the storage and transmission of electronic documents can be improved by compressing these electronic documents for storage and/or transmission. For example, if electronic documents can, on average be compressed to one-quarter their initial size, then about four times as many electronic documents can be stored in a fixed amount of data storage. Further, the transmission of these compressed electronic documents over a network or cable can occur about four times as fast as would transmission of the uncompressed electronic documents.

In the past, lossy compression may have been used for some data paths, while lossless compression may have been used for other data paths. (Lossy compression techniques compress data by discarding some of it, while lossless compression techniques compress data without discarding any of it.). For example, in some implementations, host-to-print data path 308 may utilize lossless compression in order to preserve sharp edges of text and line art in printed versions of electronic documents. On the other hand, scan-to-host data path 306 and scan-to-print data path 310 may utilize lossy compression in order to efficiently store and transmit scanned physical documents containing graphical images. Printing device 100 may be made more efficient and its software and/or hardware implementation may be simplified by using the same or a similar compression technique for at least some (and perhaps all) of its data paths.

Thus, a compression technique that supports both lossless and lossy compression is desirable. It is also desirable for both lossless and lossy compression to be able to be applied within the same document. To that point, an understanding of how images are presented may be useful.

3. Example Image

Figure 4:
FIG. 4 depicts an image that may be contained in an electronic document, according to example embodiments.

An image may be a matrix of pixels encoded according to an image format and a color model. FIG. 4 depicts an image 400 that may be included on or within a physical or electronic document handled by printing device 100. While image 400 appears in black and white, color images with similar characteristics may also be handled by printing device 100. Image 400 may be formed using various resolutions, such as 600 dots per inch (dpi) or 1200 dpi among other examples.

As can be seen in FIG. 4, image 400 contains various types of content. For instance, image 400 contains both text and line art with sharp edges. Further, image 400 also contains sections containing a continuous tone (e.g., the upper-left-hand corner of image 400), as well as sections containing photorealistic data (e.g., the lower-right-hand corner and upper-right-hand corner of image 400). Text overlays various sections of image 400. Thus, image 400 illustrates a common type of image that is used in business printing, e.g., in pages of a brochure, magazine, flyer, or advertisement.

In some possible embodiments, each of the pixels in an image, such as example image 400, may be categorized as one of three different object types: image graphics, vector graphics, or text. Image graphics include photorealistic images, such as images from photographs. The photorealistic data in the lower-right-hand corner and upper-right-hand corner of image 400 may qualify as image graphics. The non-text lines throughout image 400 may qualify as vector graphics, and the textual characters (e.g., the "E" and the "R" for instance) may qualify as text.

The object type of a particular pixel may be determined by or from the scanning unit of the printing device or a page description language (PDL) representation of an electronic document. A PDL is a language, grammar, or format that describes the appearance of a printed or displayed page at a higher level than the page's actual pixels. A pixel representation of a page may be derived from a PDL.

Thus, an electronic document may contain one or more pages that are represented by a PDL document. Each of these pages may be represented by part or all of a PDL document, and/or by an image. There are many examples of PDLs, of which the Portable Document Format (PDF) is one.

A unified compression technique may be able to accurately represent the sharp edges and lines of image 400, while still using lossy compression in order to reduce the storage requirements of an electronic document containing image 400. Particularly, it is desirable to preserve the exact characteristics of certain elements, such as text, basic geometric shapes, and line drawings, because even minor distortions to these elements can appear unpleasing to the human eye. Thus, these elements may be categorized as vector graphics or text, and may be targeted for compression in a lossless fashion.

On the other hand, photorealistic images and complex graphics with gradients can be viewed without such exactness. Thus, these elements may be categorized as image graphics, and may be targeted for compression in a lossy fashion. For instance, image graphics may be compressed in a manner such that they appear visually the same or similar to the human eye as their respective uncompressed versions.

Further, the object type of a pixel (e.g., image graphics, vector graphics, or text), may influence a color conversion applied to the pixel, as well as the type of halftone screen applied to the pixel. These issues are discussed in more detail below.

In some cases, vector graphics and text objects may appear to have similar characteristics. Indeed, these two categories can be combined in some embodiments, and processed in the same fashion. However, certain types of vector graphics, such as lightly-colored lines, appear better when processed differently from text. For instance, if lightly colored lines are processed in the same fashion as text, some of these lines may become difficult to distinguish. Consequently, applying a different color conversion and/or a different halftone screen to vector graphics may preserve and/or enhance these lines. For instance, the halftone screen selected specifically for a vector graphics pixel may result in more toner being applied when this pixel is printed.

4. Example Image Color Models

Electronic documents can be represented using a number of color models. Thus, a robust compression technique should be able to operate on some or all of these models. Further, the compression technique may include preprocessing that is specific to individual color models.

For example, the red-green-blue (RGB) color model may be used for display of images on electronic output devices, such as televisions, monitors, and computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-plane tuple (R,G,B), each plane of which can vary from zero to a pre-defined maximum value (e.g., 255). If all of the planes are 0, the result may be black. If all of the planes are at the maximum value, the result may be the brightest representable white. (The color planes described herein may also be referred to as color channels.)

RGB output is typically device-dependent, in that different output devices may display the same RGB image in a different fashion. Thus, in some cases, these differences may be perceivable by humans. In some embodiments, physical documents scanned into printing device 100 using scan-to-host data path 306 may be encoded using an RGB color model.

The cyan-magenta-yellow (CMY) color model may be used for the printing of color images by printing devices. CMY is a subtractive color model in which cyan, yellow, and magenta are applied to a white surface in various ways to reproduce a spectrum of colors. For instance, red can be formed by combining magenta and yellow, blue can be formed by combining cyan and magenta, and green can be formed by combining cyan and yellow. Thus, the CMY color model might be considered a complement of the RGB color model.

A particular pixel of a CMY image may be expressed as a three-plane tuple (C,M,Y), each plane of which can vary from 0 to a pre-defined maximum value. If all of the planes are at 0, the result may be white. If all of the planes are at the maximum value, the result may be black.

Like, RGB output, CMY output is typically device-dependent, in that the printed output of the same CMY image on different printing devices may appear to be different. In some cases, these differences may be perceivable by humans. In some embodiments, electronic documents printed by printing device 100 using host-to-print data path 308 and/or scan-to-print data path 310 may be encoded using a CMY color model.

In some embodiments, a four-plane CMYK color model can also be used. This four-plane model of CMYK may be similar to or the same as the CMY color model, with the exception that a key (black) plane is also used. In addition to possibly combining cyan, magenta, and yellow to form black, the separate key (black) ink source may be used to form black. Thus, a particular pixel of a CMYK image may be expressed as a four-plane tuple (C,M,Y,K), each plane of which can vary from zero to a pre-defined maximum value.

Using the CMYK color model, the same colors as the CMY model can be supported, but less ink is typically used because the K colorant can replace mixtures of the C, M, and Y colorants. However, the CMYK color model may not always be able to be conveniently converted to and from other color models, because the addition of the K colorant adds redundancy, e.g., the same color can be a result of mixing different C, M, Y, and K combinations. In some embodiments, one or more color tables may be used to convert pixels from the CMY model to the CMYK model, and/or between other pairs of color models.

An additional color model is gray, also referred to as grayscale, which may be used for the representation of black and white images. Unlike the RGB and CMY/CMYK color models, each pixel of the gray color model is expressed using a single plane (K) that encodes the pixel's intensity. The values used by the gray plane can vary from zero for black, to a pre-defined maximum value for white (e.g., 255). In some embodiments, one or more of the data paths supported by printing device 100 may be able to encode images using the gray color model.

Another color model is YCbCr. In some implementations, this color model may be used as an alternative representation of an image. Particularly, the Y plane may represent the brightness of a pixel, and the Cb and Cr planes may represent the blue-yellow chrominance and red-green chrominance, respectively. Despite the Y plane representing luminance, it may be referred to as a "color plane" like the Cb and Cr planes. The YCbCr color model has a well-defined relationship with the RGB and CMY color models and can be converted to and from either of these color models with relative ease. A grayscale version of the YCbCr color model may be referred to as the Y color model.

An additional advantage to the YCbCr color model is that compression of images encoded using the YCbCr color model tends to be more efficient than compression of images encoded in the RGB or CMY/CMYK color models. Particularly, the human eye is not very good at detecting high-frequency (e.g., rapidly varying) chrominance information in an image. Thus, images encoded using the YCbCr color model can exploit this information by ignoring high-frequency components of the Cb and Cr planes. So, images encoded in a particular color model may be converted to the YCbCr color model before compression in order to improve compression performance.

5. Example Attribute Plane

In addition to color planes, an image may be digitally represented using an attribute plane. While the values of the attribute plane might not appear visibly in the image, the attribute plane may be used to provide guidance to image compression and processing operations.

As an example, each pixel in an image may be associated with an array of bits (e.g., 8 bits or 16 bits) representing attributes. Some of these attributes may indicate whether a pixel is used as an overlay on top of other materials, part of an edge in the image, or being used as part of a printing or a copying feature. Other attributes may include a reference to a color conversion table to use when converting the pixel between color models and/or a reference to a halftone screen to use when printing the pixel. The bits in each pixel's associated attribute array may be determined by the scanning unit of the printing device or from the PDL of an electronic document.

An array of the attribute plane may be used to identify an object type that its associated pixel represents. These identified object types may include a graphical image, vector graphics, or text, for example. Object type tags may be one or more bits of such an attribute array.

Figure 5:
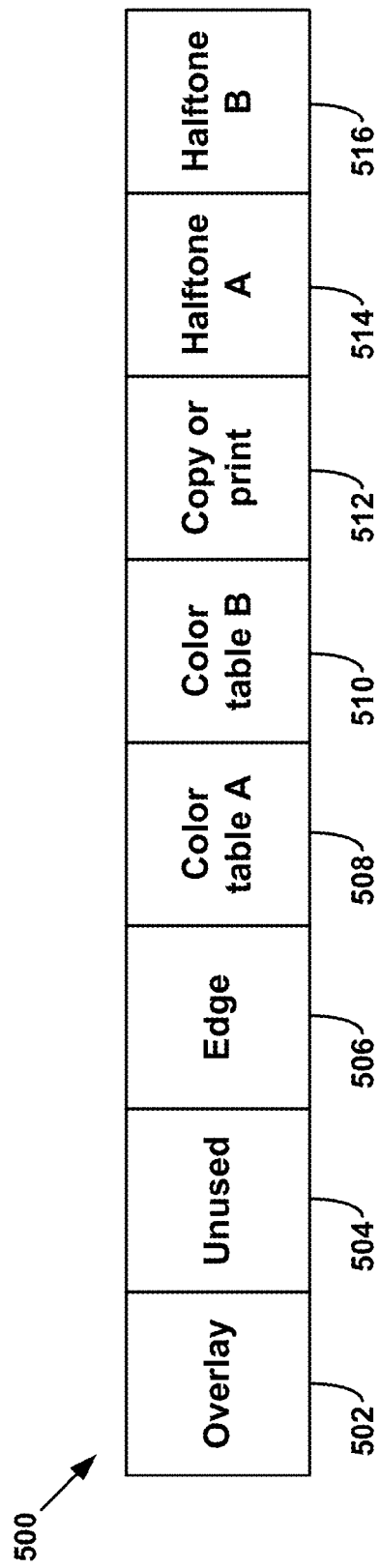
FIG. 5 depicts an attribute array, according to example embodiments.

An example attribute array 500 is shown in FIG. 5. Attribute array 500 includes overlay bit 502, unused bit 504, edge bit 506, two color table bits 508, 510, a copy or print bit 512, and two halftone bits 514, 516.

Overlay bit 502 may indicate whether the associated pixel overlays other materials. For instance, some printing devices may support applying one or more background images or patterns to some print jobs. These images or patterns may be static, such as a logo or a border, or may be dynamic, such as automatic page numbering (e.g., displaying a phrase such as "Page 1 of 3" at the bottom of each page in a document).

For instance, in the case of automatic page numbering, the printing device may be directed by a user to add page numbers. The user might select an option on the user interface of the printing device to specify automatic page numbering. Alternatively, the printer driver of the computer that transmits the electronic document to the printing device may specify automatic page numbering. In other cases, the printing device may detect which pixels are foreground pixels (such as text on a page) versus background pixels (such as the white background of a page), and indicate that the foreground pixels are overlaid.

Edge bit 506 may indicate whether the associated pixel is part of an edge in the image. For instance, edge bit 506 may take on a value of 1 when this is the case, and may take on a value of 0 when this is not the case. Edge bit 506 may be set by a scanning unit (e.g., scanning unit 302) to mark pixels near the edges of dark colored shapes that are also adjacent to light colored shapes. For instance, the edge bits may be set to 1 for pixels representing the borders of text characters on a light background. Edge bit 506 may be used to enhance the edges in images through the use of intelligent downsampling, as described below.

Color table bits 508, 510 may indicate a color table that contains a mapping of color plane values between the CMY and CMYK color models, as one possible example. As noted above, the object type of a pixel (e.g., image graphics, vector graphics, or text) may be determined from the PDL representation of the electronic document from which the pixel is derived, or by the scanning unit.

Based on the object type of the pixel, a different color conversion table may be applied. For instance, color table bits 508, 510 may take on a value of "00" when the pixel is part of a text object, "01" when the pixel is part of a vector graphics object, and "11" when the pixel is part of an image graphics object. Based on the values of color table bits 508, 510, one of several color conversion tables may be selected and applied to the pixel.

Copy or print bit 512 may indicate whether the associated pixel is being copied (scanned and then printed) or traditionally printed (e.g., from a PDL document locally stored or received from another device). The value of this bit may be combined with those of halftone bits 514, 516 to select one of up to eight halftone screens (see below for a discussion of halftoning). In some cases, electronic documents that are scanned and then printed may use certain types of halftone screens, while electronic documents that are traditionally printed may use other types of halftone screens.

Halftone bits 514, 516 may indicate whether a halftone screen is to be applied to the image when printed, and which halftone screen is to be applied. Halftoning is a technique that simulates a gradient through the use of dots that vary in size, shape, or spacing. Halftoning can decompose images containing multiple shades of various colors into a series of overlaid halftone screens, with each screen containing a single (binary) shade of a particular color. The overlaid halftone screen creates an appearance that the dots are blended into smooth tones.

Similar to color table bits 508, 510, halftone bits 514, 516 may take on values based on the type of object that the pixel represents. Thus, halftone bits 514, 516 may take on a value of "00" when the pixel is part of an image graphics object, "01" when the pixel is part of a vector graphics object, and "11" when the pixel is part of a text object. Based on the values of halftone bits 514, 516 one of several halftone screens may be selected and applied to the pixel.

Although based on the same three object types, color table bits 508, 510 may be distinct from halftone bits 514, 516. One possible reason for keeping these two distinct sets of information is to accommodate object pixel overlap blending in some PDLs. For example, when text pixels are blended with raster image pixels, color table bits 508, 510 may indicate a raster image, halftone bits 514, 516 may indicate text. This feature upholds the image quality of overlapping, blended objects.

Example attribute array 500 contains 8 bits (1 byte) per pixel. Thus, using this style of attribute array, the magnitude of the attribute plane grows linearly with the number of pixels in the image. The extent of attribute arrays associated with pixels in an image may be referred to as the attribute plane for that image.

An attribute plane may be referred to as an A plane. Thus, when an attribute plane is combined with one or more color planes, the combined attribute and color planes may be referred to as KA, CMYA, CMYKA, RGBA, YA, or YCbCrA, depending on color model being used. Herein, these examples of combined attribute and color planes may be referred to as a "color model" despite the attribute plane not actually representing a color per-se.

6. Example Imaging Pipeline

Figure 6:
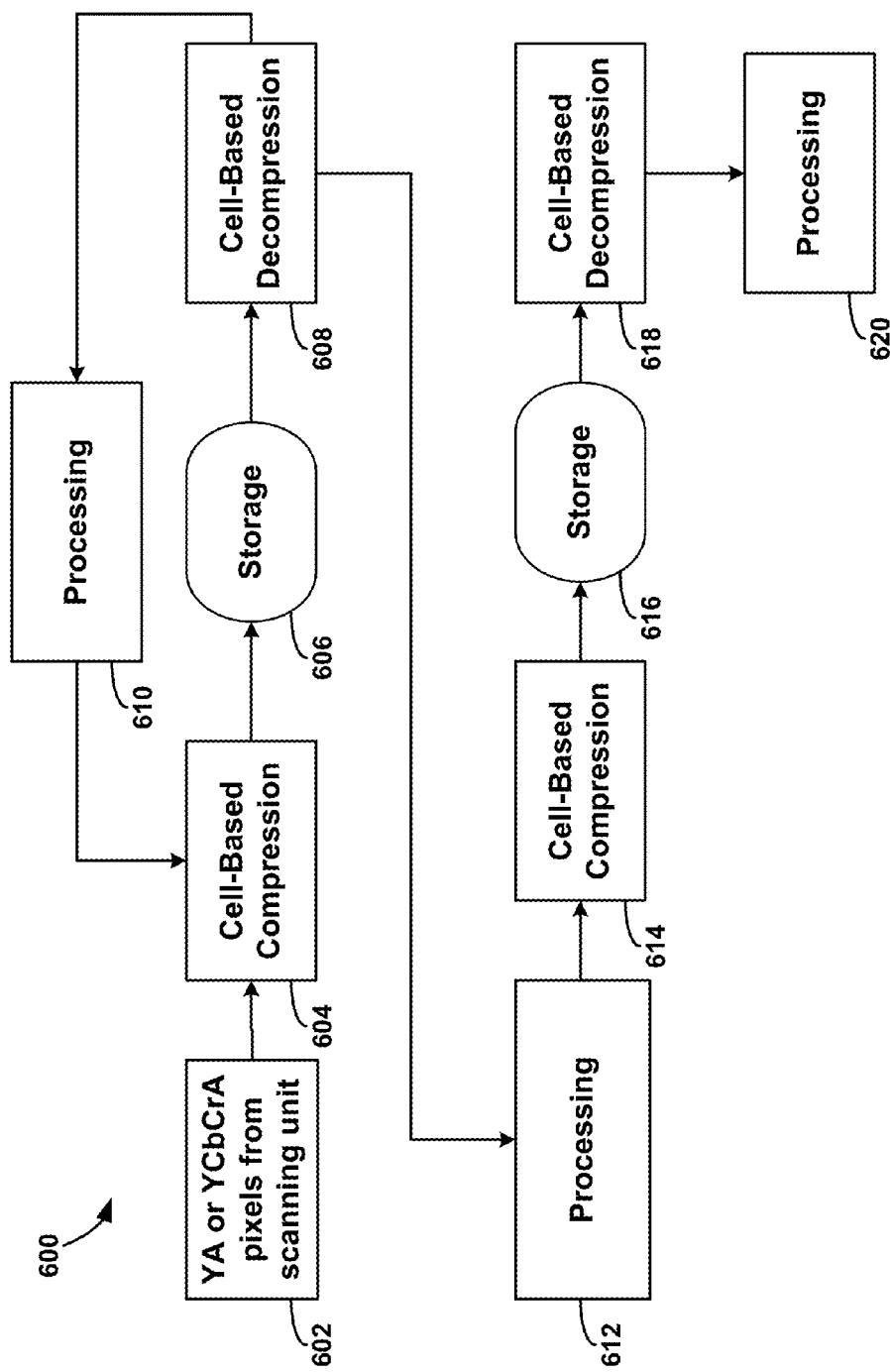
FIG. 6 depicts a document processing pipeline, according to example embodiments.

A high-level overview of an example imaging pipeline is shown in FIG. 6. This imaging pipeline takes the form of a flow chart 600, and includes multiple compression and decompression steps. Flow chart 600 may represent a series of steps carried out by a printing device in order to receive, store, and print an electronic document.

At block 602 of FIG. 6, an electronic document may be represented as one or more images formatted according to the YA or YCbCrA color models. However, these color models are chosen for purposes of illustration, and other color models may be used. The YA or YCbCrA pixels may be derived from a scanning process of an original paper document or other object. Alternatively, at block 602, the electronic document may be represented by an image format, such as a bitmap, JPEG, GIF, etc., and converted to the YA or YCbCrA color model, for instance.

At block 604, cell-based compression (discussed in detail below) may be applied to the pixels of each plane of the electronic document. Thus, for YA electronic documents, cell-based compression may be applied to the gray plane and the attribute plane. For YCbCrA electronic documents, cell-based compression may be applied separately for each of the Y, Cb, Cr, and A planes or in a composite fashion. Therefore, in some cases, the cell-based compression may compress the corresponding cells of two or more planes in the same logical operation. The result of block 604 may be a bitstream representing a compressed version of the electronic document.

At block 606, this compressed version may be stored in a storage output medium. In general, this storage may be memory of a printing device that stores compressed representations of one or more pages. Since the compression techniques described herein may be able to compress these documents to at least one-third or one-fourth of their original bitmapped size, the memory size requirements for this storage may be reduced accordingly. As a result, printing devices incorporating the embodiments herein may be less expensive to produce.

Pages compressed to the storage in block 606 might or might not be printed by the printing device. In some cases, these pages may be transmitted from the storage of block 606 to portable storage (e.g., USB storage, a secure digital (SD card), etc.) or transmitted to a personal computer host. Pages may be held in the storage of block 606 for days, weeks, and so on, until a user or a program decides to print or do something else with these pages.

At block 608, cell-based decompression may be applied to each plane of the electronic document. This may result in the re-creation of the YA or YCbCrA representation of the electronic document. However, if the cell-based compression technique uses lossy compression, the electronic document resulting from the decompression of block 608 may be different from the electronic document that was compressed by the compression of block 604. Nonetheless, the differences between these versions of the electronic document might be slight, and therefore might not be readily perceived by humans.

At block 610, the decompressed version of the electronic document may be further processed. For instance, various transforms may be applied to the electronic document. After one or more of these transforms are performed on the electronic document, the electronic document may be compressed again at block 604 and stored in storage at block 606. Application of block 610 is optional, and not all electronic documents will be subject to this processing.

At block 612, the decompressed version of the electronic document may also be further processed. At block 614, cell-based compression may be applied to each plane of the electronic document. This compression procedure may be the same as that of block 604, or may be different. For instance, the compression applied at block 614 may be configured to obtain higher or lower compression ratios than that of block 604.

At block 616, this compressed version may be stored in storage. Like the storage of block 606, this storage may be memory of a printing device that stores compressed representations of one or more pages. Since these page representations are compressed, the memory requirements and cost of storage is reduced.

At block 618, cell-based decompression may be applied to each plane of the electronic document. This may result in the re-creation of the representation of the electronic document that was compressed at block 614. As was the case for block 608, if the cell-based compression technique uses lossy compression, the electronic document resulting from the decompression of block 618 may be different from the versions of the electronic document that were compressed by the compression of block 604 and/or block 614.

At block 620, further processing may be applied to the decompressed version of the electronic document. After block 620, the electronic document may be ready for printing, or further processing may be applied.

The cell-based compression procedures of blocks 604 and 614 may be the same or different. For instance, these procedures may use different compression algorithms, or may use the same compression algorithm with the same or different settings. Likewise, the cell-based decompression procedures of blocks 608 and 618 may also be the same or different.

In some embodiments, the number of attribute plane bits used per pixel may vary based on the point at which compression takes place in flow chart 600. For instance, all bits of attribute array 500 (with the possible exception of unused bit 504) may be compressed at block 604.

However, after step 612, overlay bit 502, unused bit 504, edge bit 506, and color table bits 508, 510 may no longer be needed. Further, some types of printing devices do not have a copy function. Thus, for these printing devices, copy or print bit 512 might not be used any point in flow chart 600, and can be omitted from the compression of block 604 and block 614.

Regardless, in various embodiments, anywhere from zero to six bits of attribute array 500 may be omitted from a cell-based compression procedure. As a result, the overall number of bits that are compressed per cell may be reduced, which may in turn improve the achievable compression ratio of cells of the attribute plane.

The description herein focuses on a single instance of cell-based compression applied to the attribute and color planes of an image. The image may be a representation of a single page from an electronic document containing one or more pages. Nonetheless, multiple instances of this cell-based compression may be applied to the cell of such an image, according to pipeline 600 or some other arrangement. In this way the entire image may be compressed in an efficient fashion.

Further, cell-based decompression techniques may also be applied to the image by reversing the cell-based compression techniques described herein.

7. Example Cell Configuration

One aspect of cell-based compression is that it may divide each color plane and attribute plane of an electronic document into one or more m×n cells, and then compress each cell in a partially-independent or fully independent fashion. For example, m might be 8 and n might be 4. Alternatively, m might be 8 and n might be 8, or m might be 16 and n might be 16, as well. Other values of m and n may be used.

Each cell may be evaluated to determine what type of compression techniques might be most efficient for compressing the data in that cell. For example, if a cell consists entirely of pixels that are the same color, the data in the cell may be very efficiently compressed into a representation of the color and perhaps some overhead data. However, if a cell contains part of a photorealistic image, the data in the cell may not be able to be compressed at such a high compression ratio.

Figure 7:
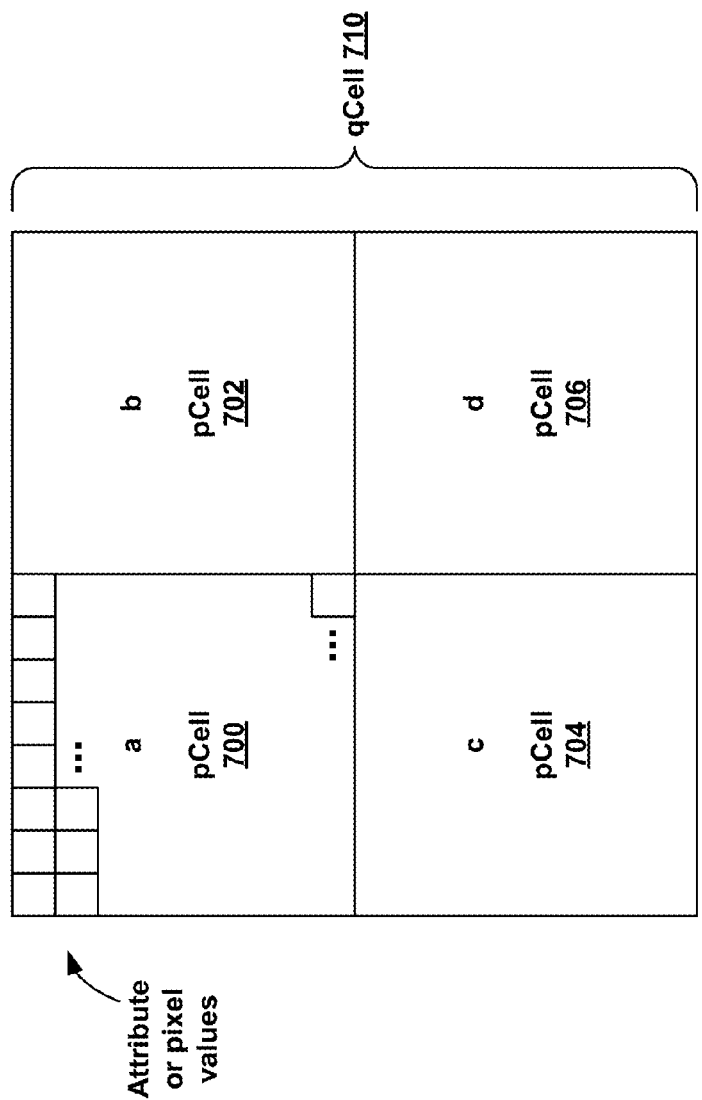
FIG. 7 depicts a macro-cell containing four cells, according to example embodiments.

FIG. 7 depicts an example cell structure that can be used with cell-based compression. For sake of convenience, cells are considered in terms of pCells and qCells. pCells may be m×n element blocks of a color plane or attribute plane of an image. Thus, for a color plane, pCell elements may be pixels, while for an attribute plane, pCell elements may be attribute arrays. qCells may be a×b element blocks of a color plane or attribute plane of an image. Each qCell may consist of some number of non-overlapping pCells. Depending on context, the terms "pCell" and "qCell" could refer to the elements of a single attribute or color plane or multiple attribute and color planes.

As an example, FIG. 7 depicts four 8×8 pCells 700, 702, 704, 706 each containing 64 attribute or pixel values for a particular plane. Each attribute or pixel value, for example, may be represented by a number in the range of 0-255, and thus may be expressed as a byte. However, other possibilities exist. For sake of simplicity, pCell 700 only shows the positions of some representative values.

A 2×2 arrangement of four pCells as shown in FIG. 7 may be referred to as a qCell. Thus, the qCell 710 of FIG. 7 may be 16×16, and may contain 256 attribute or pixel values for a particular plane. Nonetheless, a qCell could include a different number of pCells (e.g., a 3×2, 2×3, or 3×3 block of pCells).

FIG. 7 refers to the upper-left-hand pCell as the "a" pCell, the upper-right-hand pCell as the "b" pCell, the lower-left-hand pCell as the "c" pCell, and the lower-right-hand pCell as the "d" pCell. These designations may be referred to as pCell IDs, and are merely a convenient way to distinguish the locations of pCells within a qCell, and will be used in the interleaving discussion below.

The cell-based compression techniques described herein may operate on pCells and qCells. For purposes of simplicity, it will be assumed that 8×8 pCells and 16×16 qCells are used. However, this assumption is made with the understanding that differently sized pCells and qCells may be used instead.

Further, a planar pCell or qCell may refer to elements of a single plane, while a composite pCell or qCell may refer to corresponding elements across multiple planes. For instance, when the CMYA color model is used, a planar pCell may include elements of one of the C, M, Y, or A planes, while a composite pCell may include elements from two or more of the C, M, Y, and A planes.

8. Example Cell-Based Compression

The next several sub-sections describe various cell-based compression techniques in detail. Each of these techniques operates with pCells, qCells, or both. An overview of these compression techniques is provided in Table 1.

TABLE 1

| Compression | Cell Type | Lossy or Lossless | Color Plane | Attribute Plane |
|---|---|---|---|---|
| D1, D1D | pCell | Lossless | No | Yes |
| P2, P2D | pCell | Lossless | No | Yes |
| P4 | pCell | Lossless | No | Yes |
| D1C | qCell | Lossless | No | Yes |
| D1E | N/A | N/A | No | Yes |
| D64 | pCell | Lossless | No | Yes |
| EOF | N/A | N/A | Yes | Yes |
| DCT 4:2:0/DCT Y | qCell | Lossy | Yes | No |
| DCT 4:2:0 with intelligent down-sampling | qCell | Lossy | Yes | No |
| DCTL | qCell | Lossy | Yes | No |
| QD1/QD1D | qCell | Lossy | Yes | No |
| QD1C | qCell | Lossless | Yes | No |
| QD1E | N/A | N/A | Yes | No |

Compression techniques that are used only on the attribute plane may be described below in more generic terms, because in some systems they may be used on color planes as well for certain embodiments. For instance, suppose that the cell-based compression disclosed herein is used in block 604 of pipeline 600. A different compression suite may be used in block 614 of pipeline 600. Therefore, D1, D1D, P2, P2D, P4, D1C, D1E, and D64 compression is described generically.

a. D1 and D1D Compression

D1 compression may be used when all of the attributes or pixels in a given pCell are the same. For instance, suppose that each attribute or pixel in the pCell takes on a value from 0 to 255. If all of the values are 74, as just one example, then D1 compression may be applied to this cell. In this way, the amount of data needed to represent the pCell can be dramatically reduced.

A variation of D1 compression, which may be referred to as D1D compression, may be used when the color value is a default color. For instance, in the YCbCr color space's Y plane, the gray color space, and all CMYK color spaces, the default values may be 0 and 255. In the YCbCr color space's Cb and Cr planes, the default values may be 128 and 255. D1D compression has a somewhat more efficient encoding than D1 compression. As there are only a limited number of default values (e.g., 2) in a color space, these default color values can be represented with a small number of bits (e.g., 1). Consequently, D1D compression may require fewer bits per pCell than D1 compression.

For the attribute plane, the D1D default value may be predetermined (e.g., 0 or 128) or set manually by a user.

In some cases, multiple adjacent pCells (e.g., pCells in a row or column) with same value for all attributes or pixels may be represented using D1 or D1D encoding. There are two possible ways in which this may occur. Both D1 and D1D compression allow for a run length to be encoded. The run length represents how many total pCells were also compressed using D1 compression. D1 compression also allows a previously used (cached attribute or pixel value) to be used in the encoding of a subsequent pCell.

TABLE 2

| Compression | Opcode | Options | Arguments |
|---|---|---|---|
| D1 | 001 | V' | Length/Value (opt) |
| D1D | 000 | V | Length |

Table 2 provides example binary encodings for D1 and D1D compression. For D1 compression, a compressed representation of a pCell begins with the opcode 001. If the V' bit is 1, the D1 encoding also includes the 1-byte value argument (which is the same for all attributes or pixels in the pCell). If the V' bit is 0, the value argument is omitted from the encoding, and the value in the most recent D1 encoding (e.g., a cached value) is used for all attributes or pixels in the pCell. The length argument may be two bits, thus supporting a run length within a qCell from 1 to 4 pCells. The value argument applies to pixel values as well as attribute values. Therefore, the value argument may be 8 bits when compressing a pCell of the color plane. As noted above, however, less than 8 bits may be used to represent attribute plane values, and the size of the value field may be decreased appropriately.

For D1D compression, a compressed representation of a pCell begins with the opcode 000. The V bit indicates which of the two default values is to be used (e.g., if V is 0, then one value will be used, and if V is 1, then the other value will be used). The length argument may be used in the same fashion as it is used for D1 compression.

b. P2 and P2D Compression

P2 compression may be used when each of the attributes or pixels in a given pCell can be represented using one of two values. For instance, if the attributes or pixels in a cell can take on values between 0 and 255, but all values are either 76 or 125, P2 compression may be used on the pCell. When P2 compression is used, the two values, as well as a bitmap of the attributes or pixels in the pCell, may be encoded. The bitmap indicates which value is associated with each attribute or pixel in the pCell. Similar to D1 and D1D compression, P2 compression may use caching of the most recently used pair of values.

A variation of the P2 compression technique, which may be referred to as P2D compression, may be used when only two default color values appear in a cell. As noted above, in the YCbCr color space's Y plane, the gray color space, and all CMYK color spaces, the default values may be 0 and 255. In the YCbCr color space's Cb and Cr planes, the default values may be 128 and 255. Thus, P2D compression may encode the bitmap of the attributes or pixels in the pCell, but does not need to explicitly encode the values of the attributes or pixels, because the default values are used.

For the attribute plane, one or both P2D default values may be predetermined (e.g., 0 and 128) or set manually by a user.

TABLE 3

| Compression | Opcode | Options | Arguments | Bitmap |
|---|---|---|---|---|
| P2 | 011 | V'/P | Line map (opt)/ value 1 (opt)/ value 2 (opt) | Up to 8 lines (opt) |
| P2D | 010 | P | Line map (opt) | Up to 8 lines (opt) |

Table 3 provides example binary encodings for P2 and P2D compression. For P2 compression, a compressed representation of a pCell begins with the opcode 011. If the V' bit is 1, the P2 encoding also includes the 2 bytes indicating the pair of values (value 1 and value 2) used by the attributes or pixels in the pCell. If the V' bit is 0, these values are omitted from the encoding, and the values in the most recent P2 encoding (e.g., the cached values) are used for the attributes or pixels in the pCell.

For P2D compression, a compressed representation of a pCell begins with the opcode 010. For both P2 and P2D compression, when the P option is 1, the line map argument is present, indicating which of the 8 lines in the bitmap are also present. When the P option is 0, no line map argument or lines in the bitmap are present. Instead, a cached bitmap from the most recent pCell compressed with P2 or P2D may be used.

Each bit of a line map indicates the presence of a corresponding line field in the bitmap. If the line map is present, then it may be assumed that at least one line is also present in the bitmap. Therefore, the line map might only use 7 bits to encode the 2nd through 8th line in the bitmap. For each bit of the line map a 0 indicates that the corresponding line is absent, and the previous line repeats, while a 1 indicates that the corresponding line is present.

c. P4 Compression

P4 compression may be used when all of the pixels in a given cell can be represented using three or four color values. When P4 compression is used, three or four values, as well as a bitmap of the attributes or pixels in the pCell, may be encoded. The bitmap indicates which value is associated with each attribute or pixel in the pCell.

TABLE 4

| Compression | Opcode | Arguments | Bitmap |
|---|---|---|---|
| P4 | 100 | Line map/value 1/value 2/value 3/value 4 | 1 to 8 lines |

Table 4 provides an example binary encoding for P4 compression. For P4 compression, a compressed representation of a pCell begins with the opcode 100. The 7-bit line map defines how the bitmap is compressed, similar to that of a P2 bitmap. For each bit of the line map, a 0 indicates that the corresponding line is absent, and the previous line repeats, while a 1 indicates that the corresponding line is present.

The four value arguments are 8-bit fields representing the values of elements found in the pCell. In order to distinguish between these values, each line of the bitmap (if present) may be 16 bits long. When only three values are encoded by P4 compression, the "value 4" argument may be present but ignored.

d. D1C and D1E Compression

D1C and D1E compression facilitate efficient encoding of runs of consecutive cells that are candidates for D1 or D1D compression. Encoding these runs may dramatically increase compression performance on images with sections exhibiting a solid color (e.g., a white background). Two types of D1 or D1D runs may be supported: (i) inter-qCell runs of D1 or D1D candidate pCells that cross qCells, and (ii) intra-qCell runs of D1 or D1D candidate pCells within a qCell.

Inter-qCell D1 or D1D runs encode D1 or D1D runs that span two or more qCells. When the two right most pCells (the "b" and "d" pCells) in a qCell contain an 8×16 array of constant pixel values that get encoded using D1 compression, this implies the start of a D1 or D1D run, and causes the encoding mode to change from a normal encoding mode to D1 or D1D run encoding mode. This encoding mode is tracked per plane, and on qCell boundaries. Thus, for a particular plane, the mode change to D1 or D1D run encoding mode takes place at the end of a qCell boundary.

In D1 or D1D run encoding mode, only two codes are defined: D1C (continue) and D1E (end), and they are each encoded using a single bit. As long as subsequent qCells contain the same 16×16 pixel value as the two D1 or D1D candidate pCells that began the run, a 1-bit D1C opcode is emitted, and D1 or D1D run encoding mode continues. If a subsequent qCell contains anything other than a solid value matching the start of the run, then the run ends. In this case, a 1-bit D1E code is emitted and normal encoding mode is reentered. Also, any remaining D1, P2, P4, or D64 encodings for the present qCell are emitted.

Intra-qCell D1 or D1D runs encode D1 or D1D runs within a qCell. For instance, a 2-bit run length may be used to encode D1 and D1D runs that extend from 1 to 4 pCells within a qCell. Such runs are denoted D1(n) and D1D(n), where n takes on values 1, 2, 3, or 4.

TABLE 5

| Compression | Opcode |
|---|---|
| D1C | 1 |
| D1E | 0 |

Table 5 provides example binary encodings for D1C and DIE compression. For D1C compression, a 1 indicates a continuation of a D1 or D1D run, and all four pCells in the given qCell match the D1 or D1D cells of the current run. For DIE compression, a 0 indicates the end of a D1 or D1D run.

e. D64 Compression

D64 compression is a lossless technique that is used to encode a pCell of the attribute plane for which D1, D1D, P2, P2D, and P4 compression is not appropriate. For instance, if the pCell contains 5 or more different values, D64 compression may be used.

D64 compression encodes all 64 values of an 8×8 attribute pCell, and when included with its header, the results in a very small expansion rather than a compression. However, since it is desirable for the attribute plane to be compressed in a lossless fashion, D64 compression may be necessary in some situations.

Nonetheless, depending on where the cell-based compression is taking place in compression pipeline 600, all 8 bits of the attribute values in a pCell might not be encoded. Instead, 2-8 bits of these values may instead be packed and encoded. This results in an improvement for D64 compression.

TABLE 6

| Compression | Opcode | Attributes |
|---|---|---|
| D64 | 11 | 64 attributes encoded using 2-8 bits per attribute |

Table 6 provides an example binary encoding for D64 compression. A compressed representation of a D64 pCell begins with the opcode 11, and also includes the 64 attribute arrays in the pCell, encoded using 2-8 bits per attribute. The number of bits per attribute array is based on how many attribute bits can be omitted when compressing the attribute plane, as discussed above.

f. End of File (EOF)

An EOF is not a compression technique per-se, but instead is defined to signal the end of a compression stream. At a compressor, after all input data has been compressed and the last codes of the last qCell have been emitted, an EOF sequence can be emitted. The EOF is emitted as an attribute plane code.

If the attribute plane is in D1 or D1D run encoding mode, a D1E may be emitted to return to normal encoding mode before the EOF is emitted. Additionally, an EOF automatically terminates any active inter-qCell D1 or D1D runs on any plane other than the attribute plane.

TABLE 7

| Compression | Opcode | Value |
|---|---|---|
| EOF | 001 | 1 00 0000 0000 |

Table 7 provides an example binary encoding for an EOF. After an opcode of 001, the binary value "10000000000" is emitted. Since the EOF shares an opcode with D1 compression, this value can be used to differentiate an EOF from a D1 encoding of a pCell. g. DCT 4:2:0 or DCT Y Compression DCT 4:2:0 compression refers to using discrete cosine transform (DCT) techniques to compress a downsampled qCell such that the resolution of the Cb and Cr color planes is reduced by a factor of 2 in both the horizontal and vertical directions.

As a composite mode operation, DCT 4:2:0 compression may compress the Y plane using one DCT operation per pCell (for a total of four Y plane DCT operations), while downsampling and compressing the Cb and Cr planes into one pCell each. DCT 4:2:0 compression may also involve: a DCT transform, scaling, quantization, reordering from a two-dimensional coefficient array to one-dimensional data, and Huffman entropy coding.

For the Cb and Cr planes, this technique first downsamples a qCell to the size of a pCell, and then applies DCT encoding to the resulting pCell. As an example, a 16×16 qCell may be downsampled to an 8×8 pCell. The downsampling procedure may involve dividing the 16×16 qCell into 64 non-overlapping 2×2 blocks, and replacing each block with a single pixel value that is the average of the pixel values in the respective block (whether these 2×2 blocks represent any edges is not considered). The resulting 64 average values make up the 8×8 cell. Notably, this downsampling provides an initial 4:1 compression ratio, and then the DCT encoding provides additional compression on top of that.

DCT Y compression refers to performing DCT encoding on each of the four pCells of the Y plane of a grayscale image (i.e., where no Cb or Cr plane is present). Thus, DCT Y is actually a planar mode operation, but can be considered a nominal composite mode operation since there is only one color plane.

TABLE 8

| Compression | Opcode | Bitmap |
|---|---|---|
| DCT 4:2:0/ DCT Y | N/A | DCT 4:2:0 encoding for four Y plane pCells, one downsampled Cb plane pCell, and one downsampled Cr plane pCell (6-200 bits on average for each)/ DCT Y encoding for the Y plane pCells (6-200 bits on average for each). |

Table 8 provides an example binary encoding for DCT 4:2:0 and DCT Y compression. DCT compression may involve no opcode—instead it may consist of the six fields of DCT compressed pCells, as defined in Table 8. Due to interleaving with the attribute plane (see the discussion of interleaving below) these compressed pCells can be separated from each other by compressed attribute pCells, eliminating the need for an opcode for DCT 4:2:0 compression. Nonetheless, some representations of DCT 4:2:0 compression may include one or more opcodes. Like DCT 4:2:0 encodings, DCT Y encodings typically do not use an opcode.

In some embodiments, each DCT encoding may be a collection of quantized DCT coefficients packaged according to a subset of the Joint Picture Experts Group (JPEG) standard, with Huffman encoding.

h. DCT 4:2:0 Compression with Intelligent Downsampling

DCT 4:2:0 compression with intelligent downsampling is identical to that of the DCT 4:2:0 compression discussed above, with an exception—the downsampling procedure weighs pixels that represent edges more heavily than pixels that do not represent edges.

Downsampling is advantageous because it can improve compression ratios while it generally avoids degrading image quality. This is especially true on the Cb and Cr planes for image content, because these planes are inherently tolerant of artifacts that can be introduced by downsampling. On the other hand, text and vector objects do not have this tolerance. Downsampling text and vector objects can degrade detail and sharpness, and may introduce artifacts such as color shifts.

The intelligent downsampling technique improves upon the basic downsampling by taking advantage of the edge bits in the attribute plane. These edge bits are used to adjust the downsampling so that sharpness is maintained in text and vector objects, thereby increasing the quality of compressed images.

Particularly, in each 2×2 block (4 pixels) that is to be replaced with a single downsampled pixel value, the number of pixels that are associated with edge bits of the attribute plane are counted. If this sum is 0 or 4, then the pixel values of the 4 pixels are averaged and written to the downsampled pixel value. However, if 1 to 3 of the 4 pixels are associated with edge bits, then only the values of pixels are associated with edge bits are averaged and written to the downsampled pixel value.

As an example, suppose that a 2×2 block contains the following Cb or Cr plane pixel values: 0, 72, 76, and 1. Suppose further that the pixels with the values of 72 and 76 are associated with edge bits, but the pixels with the values of 0 and 1 are not. Then, the pixels with the values of 72 and 76 may be averaged and the resulting pixel value of 74 may be written to the downsampled pixel value. Consequently, the edge represented by the pixels with the values of 72 and 76 may be enhanced.

DCT 4:2:0 compression with intelligent downsampling may use the encoding defined in Table 8.

i. DCTL Compression

DCTL compression is also similar to DCT 4:2:0 compression, except that it downsamples and compresses all color planes, not just the Cb and Cr planes. DCTL compression may be applied to qCells with small ranges of luminance values on the Y plane.

TABLE 9

| Compression | Opcode | Bitmap |
|---|---|---|
| DCTL | 1 | DCT encoding for one pCell of a single color plane (6-200 bits on average) |

Table 9 provides an example binary encoding for DCTL compression. For DCTL compression, a compressed representation of a plane of a qCell begins with the opcode 1, and the remaining part of the representation is a DCT encoding. Similar to the DCT 4:2:0 case, the DCT encoding may be a collection of quantized DCT coefficients packaged according to a subset of the JPEG standard, with Huffman encoding.

j. QD1 and QD1D Compression

QD1 compression may be used when all of the pixels in a given qCell are the same or close in value. QD1 compression encodes an entire qCell with the same pixel value. Whether the pixel values in the qCell are close enough to one another may be determined by examining the range of pixel values within each pCell of the qCell, and the difference between the average values of each pCell. If, for example, the range of pixel values within each pCell is less than or equal to a cell-level threshold value, and the average values of the pCells are all within a macro-cell-level threshold value of one another, QD1 compression may be used. In some embodiments, the cell-level threshold value may be between 2 and 16, while the macro-cell-level threshold value may be between 1 and 8, for instance.

QD1D compression is analogous to that of D1D compression. Thus, QD1D compression can be used when the pixel values in a qCell match the default values for Y, Cb, or Cr.

QD1 and QD1D compression are both lossy variations of D1 and D1D compression, respectively. By allowing a limited amount of loss with QD1 and QD1D compression, compression ratios can be greatly increased over that of DCT-based compression. Additionally, like D1 and D1D compression, QD1 and QD1D compression allow runs, which further improve compression ratios.

To that point, multiple adjacent qCells (e.g., qCells in a row or column) with same pixel values may use QD1 or QD1D encoding. Each QD1 and QD1D encoding implicitly indicates the beginning of a run of QD1 or QD1D cells, respectively. If a run of two or more QD1 or QD1D cells in the same color plane exists, then the second and any subsequent QD1 or QD1D cells in the run may be represented by QD1C encodings (see below). A run may end with a QD1E encoding (see below).

TABLE 10

| Compression | Opcode | Options | Arguments |
|---|---|---|---|
| QD1 | 01 | V' | Value (opt) |
| QD1D | 00 | V | |

Table 10 provides example binary encodings for QD1 and QD1D compression. For QD1 compression, a compressed representation of a qCell begins with the opcode 01. If the V' bit is 1, the QD1 encoding also includes the 1-byte pixel value argument (which is the same for all pixels in the qCell). If the V' bit is 0, the value argument is omitted from the encoding, and the value in the most recent QD1 encoding (e.g., a cached value) is used for all pixels in the qCell.

For QD1D compression, a compressed representation of a pCell begins with the opcode 00. The V bit indicates which of the two default values is to be used (e.g., if V is 0, then one value will be used, and if V is 1, then the other value will be used).

k. QD1C and QD1E Compression

As noted above, when encoding non-initial cells of a run within a particular color plane, only two codes are defined: QD1C (continue) and QD1E (end), and they are each encoded using a single bit. As long as subsequent qCells contain the same pixel value as the qCell that began the run, a 1-bit QD1C opcode is emitted, and QD1 or QD1D run encoding mode continues. If a subsequent qCell contains anything other than a solid value matching the start of the run, then the run ends. In this case, a 1-bit QD1E code is emitted and normal encoding mode is reentered.

TABLE 11

| Compression | Opcode |
|---|---|
| QD1C | 1 |
| QD1E | 0 |

Table 11 provides example binary encodings for QD1C and QD1E compression. For QD1C compression, a 1 indicates a continuation of a QD1 or QD1D run. For QD1E compression, a 0 indicates the end of a QD1 or QD1D run.

l. Composite and Planar Modes

As noted above, qCells may be compressed in either a planar mode (each plane is compressed independently) or a composite mode (two or more planes are compressed in a related fashion). In some embodiments, the attribute plane might only be compressed using planar mode, but the color planes may be compressed using either mode, based on their characteristics.

In order to indicate, in the compressed bitstream, the mode that is being used for a particular qCell, a special q-opcode may be emitted at the beginning of the compressed representation of each qCell. When a qCell is compressed using composite mode, the q-opcode may be a 1, whereas when a qCell is compressed using planar mode, the q-opcode may be a 0.

TABLE 12

| Composite or Planar Mode? | qCell Compression | q-op-code | Opcode Normal mode | Run mode |
|---|---|---|---|---|
| Composite | DCT 4:2:0/ DCT Y | 1 | N/A | N/A |
| Planar | QD1 | 0 | 01 | N/A |
| | QD1D | | 00 | N/A |
| | DCTL | | 1 | N/A |
| | QD1C | | N/A | 1 |
| | QD1E | | N/A | 0 |

Table 12 specifies when composite and planar modes are used. For instance, when DCT 4:2:0 compression (with or without intelligent downsampling) or DCT Y is used for a qCell, that qCell is prefaced by a q-opcode of 1, but no opcodes are present for the encodings of each color plane within the qCell.

When any other compression technique is used for a qCell, that qCell is prefaced with a q-opcode of 0, and the compression technique used is indicated with its opcode. Also, the distinction between normal mode and run mode only exists in planar mode. For instance, any qCell encoding using QD1, QD1D, or DCTL compression is performed in normal mode, while any encoding using QD1C or QD1E compression is performed in run mode. Switching from planar mode to composite mode implicitly ends all runs.

Note that composite encoding does not include encoding of the attribute plane. It is assumed that the attribute plane is encoded separately.

More examples of composite mode and planar mode encodings are provided below in the discussion of interleaving.

9. Example Decision Trees

The encoding of pCells and qCells may be based on one or more decision trees. Each decision tree illustrates a process through which various factors are considered before a pCell or qCell is encoded. There may be separate decision trees for attribute planes, color planes, and grayscale planes. For instance, it is desirable to not lose any information when compressing an attribute plane. Therefore, attribute planes may be compressed using various lossless compression techniques. On the other hand, it is desirable to compress some portions of color planes (e.g., vector graphics and text portions) and grayscale with varying degrees of loss based on a characterization of the pixels. In this way, details in the original image can be preserved when desired, but high compression ratios can still be achieved.

a. Color Plane Decision Tree

Figure 8:
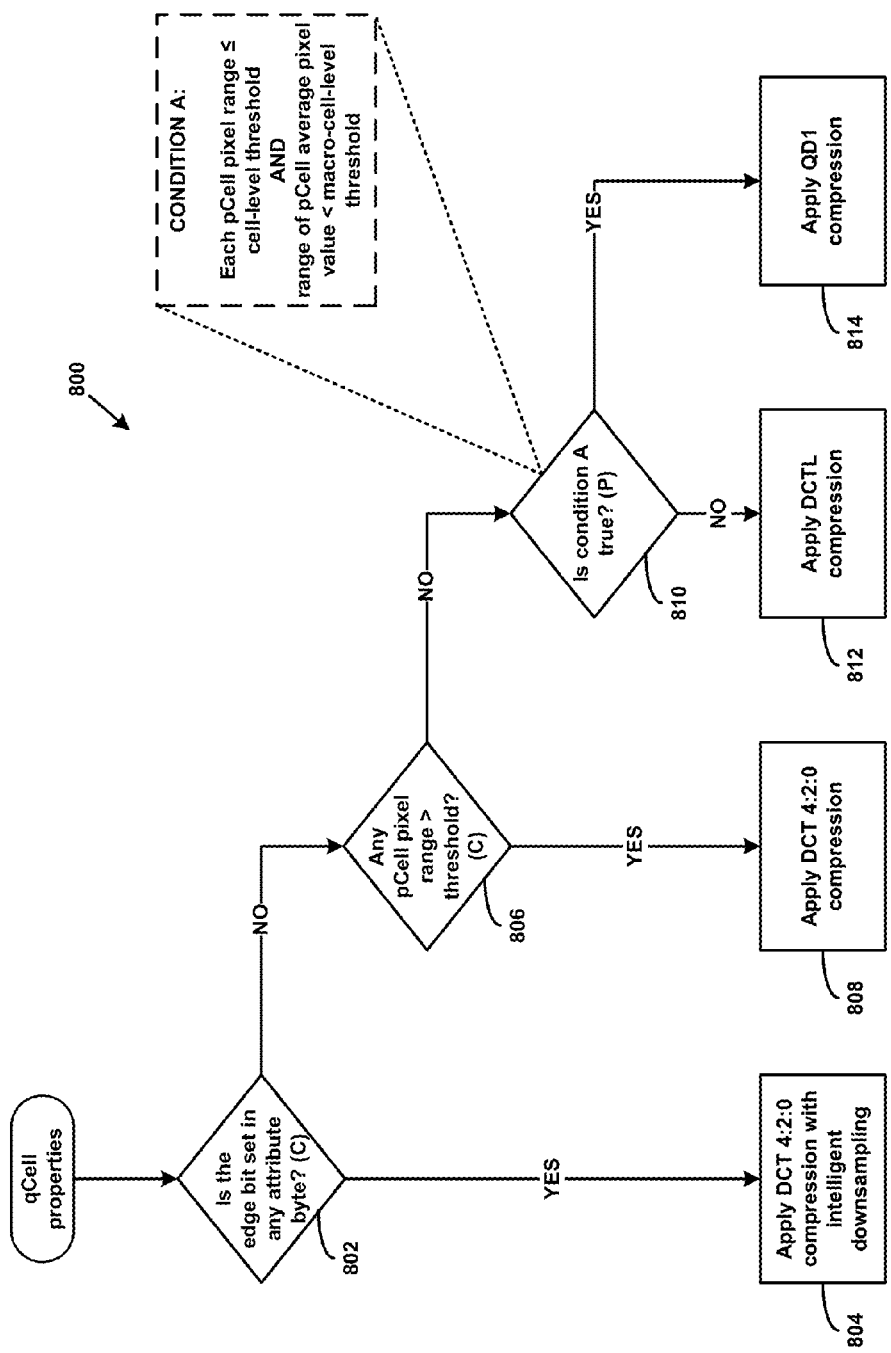
FIG. 8 depicts a color plane decision tree, according to example embodiments.

FIG. 8 depicts a color plane decision tree 800, in accordance with example embodiments. This decision tree considers the properties of a qCell, with the understanding that a qCell consists of four non-overlapping pCells. The sizes of such a qCell and its subsidiary pCells may be 16×16 and 8×8, respectively. However, other sizes may be used instead.

It is assumed that the each pixel in the qCell is tagged with an indication of whether the pixel is part of an edge in the input image. These tags may reside in the attribute plane for the qCell.

In each decision block 802, 806, 810, the type of decision is indicated parenthetically. If the decision is made on a planar basis, a parenthetical P is present. If the decision is made on a composite basis, a parenthetical C is present.

Planar decisions are made by considering the qCells and/or pCells of each color plane separately. Thus, for instance, a planar decision may consider the color properties and/or attributes associated with a single qCell and/or pCell. However, a composite decision may consider the qCell and pCell properties and associated attributes for all color planes in a location of the image defined by the qCell.

For purposes of simplicity, QD1D compression is not referenced explicitly in decision tree 800. However, wherever QD1 is considered or used, QD1D compression may be considered or used as well. Thus, block 814 may use QD1D compression. Runs of consecutive QD1 or QD1D encodings are also not explicitly considered in decision tree 800, but may be used regardless.

At block 802, it is determined whether an edge bit is set for any attribute byte in the qCell. If so, DCT 4:2:0 compression with intelligent downsampling is applied at block 804. In doing so, the sharpness of the edges in the image may be preserved and/or enhanced.

Otherwise, at block 806, it is determined whether any pCell in any color plane exhibits a pixel range greater than a predetermined threshold. If so, DCT 4:2:0 compression without intelligent downsampling may be applied at block 808. The pixel range of a pCell may be determined by subtracting the lowest pixel value in the pCell from the highest pixel value in the pCell. The predetermined threshold may take on values such as 8, 16, 32, etc.

Otherwise, at block 810, condition A is tested separately for each color plane. In order to be met, condition A requires that (i) each pCell's pixel range is less than or equal to a predetermined cell-level threshold, and (ii) the range of pCell average pixel values is less than a predetermined macro-cell-level threshold. The predetermined cell-level threshold may take on values such as 4, 8, 16, etc., and the predetermined macro-cell-level threshold may take on values such as 2, 4, 8, etc. In some embodiments, the predetermined macro-cell-level threshold is less than the predetermined cell-level threshold, and the predetermined cell-level threshold is less than the predetermined threshold.

If condition A is true, then the pixels in the qCell of the plane in question have a narrow range of pixel values, and QD1 compression is applied at block 814. If condition A is not true, then DCTL compression is applied at block 812.

FIG. 8 depicts one possible color plane decision tree. Other such decision trees are possible.

b. Grayscale Plane Decision Tree

Figure 9:
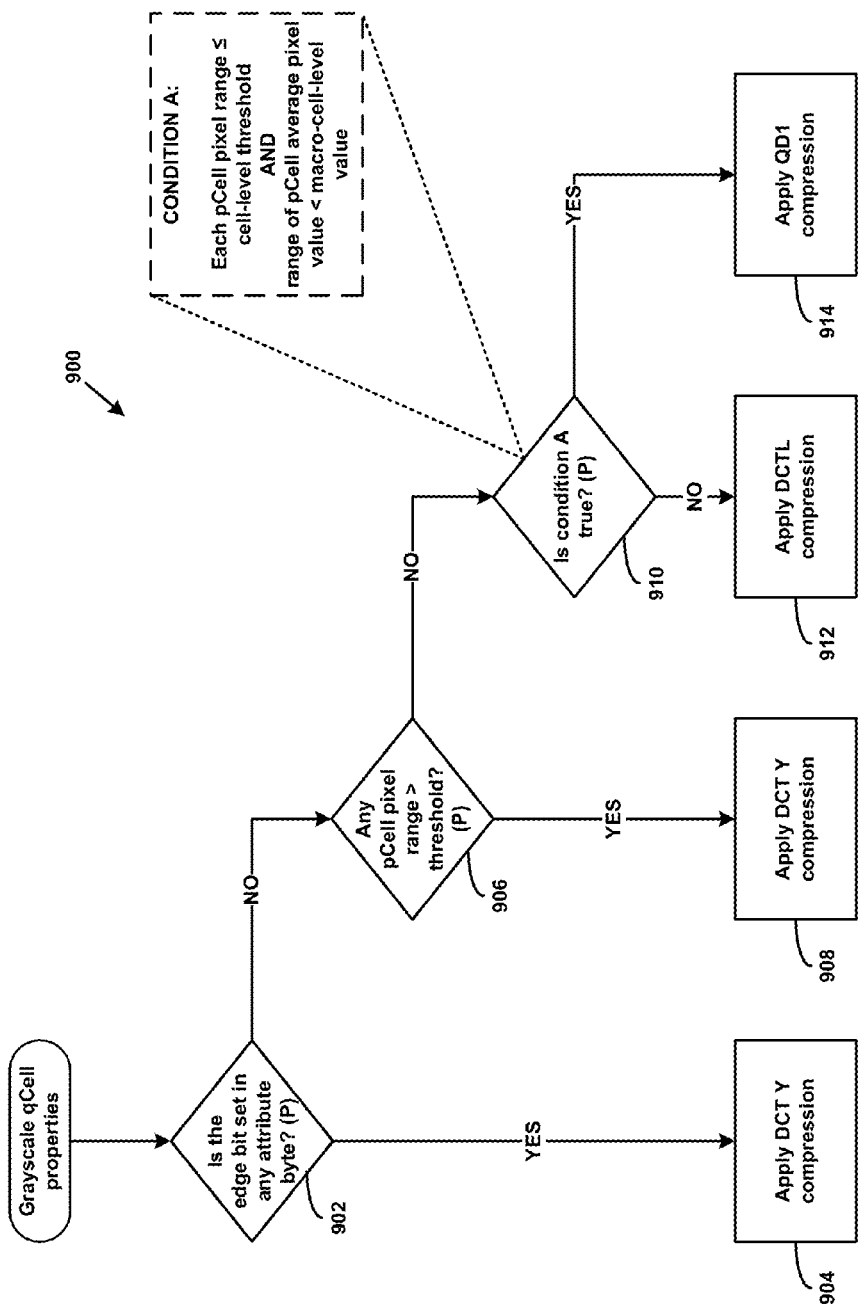
FIG. 9 depicts a grayscale plane decision tree, according to example embodiments.

FIG. 9 depicts a grayscale plane decision tree 900, in accordance with example embodiments. This decision tree considers the properties of a qCell, with the understanding that a qCell consists of four non-overlapping pCells. The sizes of such a qCell and its subsidiary pCells may be 16×16 and 8×8, respectively. However, other sizes may be used instead. Grayscale images include only the luminance (Y) or key (K) planes, so qCells from these images can be compressed in a planar fashion.

As was the case for the color plane decision tree, it is assumed that the each pixel in the qCell is tagged with an indication of whether the pixel is part of an edge in the input image. These tags may reside in the attribute plane for the qCell.

In each decision block 902, 906, 910, the type of decision is indicated parenthetically. Since grayscale images have a single color plane, all such decisions are planar. Thus, these decisions consider the properties and/or attributes associated with a single qCell and/or pCell.

For purposes of simplicity, QD1D compression is not referenced explicitly in decision tree 900. However, wherever QD1 is considered or used, QD1D compression may be considered or used as well. Thus, block 914 may use QD1D compression. Runs of consecutive QD1 or QD1D encodings are also not explicitly considered in decision tree 900, but may be used regardless.

At block 902, it is determined whether an edge bit is set for any attribute byte in the qCell. If so, DCT Y compression is applied at block 904. Otherwise, at block 906, it is determined whether any pCell in the pixel plane exhibits a pixel range greater than a predetermined threshold. If so, DCT Y compression may be applied at block 908. The pixel range of a pCell may be determined by subtracting the lowest pixel value in the pCell from the highest pixel value in the pCell. The predetermined threshold may take on values such as 8, 16, 32, etc.

DCT Y compression performs DCT-based compression on each of the pCells in a qCell. For example, a 16×16 qCell may be divided into four 8×8 pCells, and DCT-based compression may be applied to each 8×8 pCell.

Otherwise, at block 910, condition A is tested. In order to be met, condition A requires that (i) each pCell's pixel range is less than or equal to a predetermined cell-level threshold, and (ii) the range of pCell average pixel values is less than a predetermined macro-cell-level threshold. The predetermined cell-level threshold may take on values such as 4, 8, 16, etc., and the predetermined macro-cell-level threshold may take on value such as 2, 4, 8, etc. In some embodiments, the predetermined macro-cell-level threshold is less than the predetermined cell-level threshold, and the predetermined cell-level threshold is less than the predetermined threshold.

If condition A is true, then the pixels in the qCell have a narrow range of pixel values, and QD1 compression is applied at block 914. If condition A is not true, then DCTL compression is applied at block 912.

FIG. 9 depicts one possible grayscale plane decision tree. Other such decision trees are possible.

c. Attribute Plane Decision Tree

Figure 10:
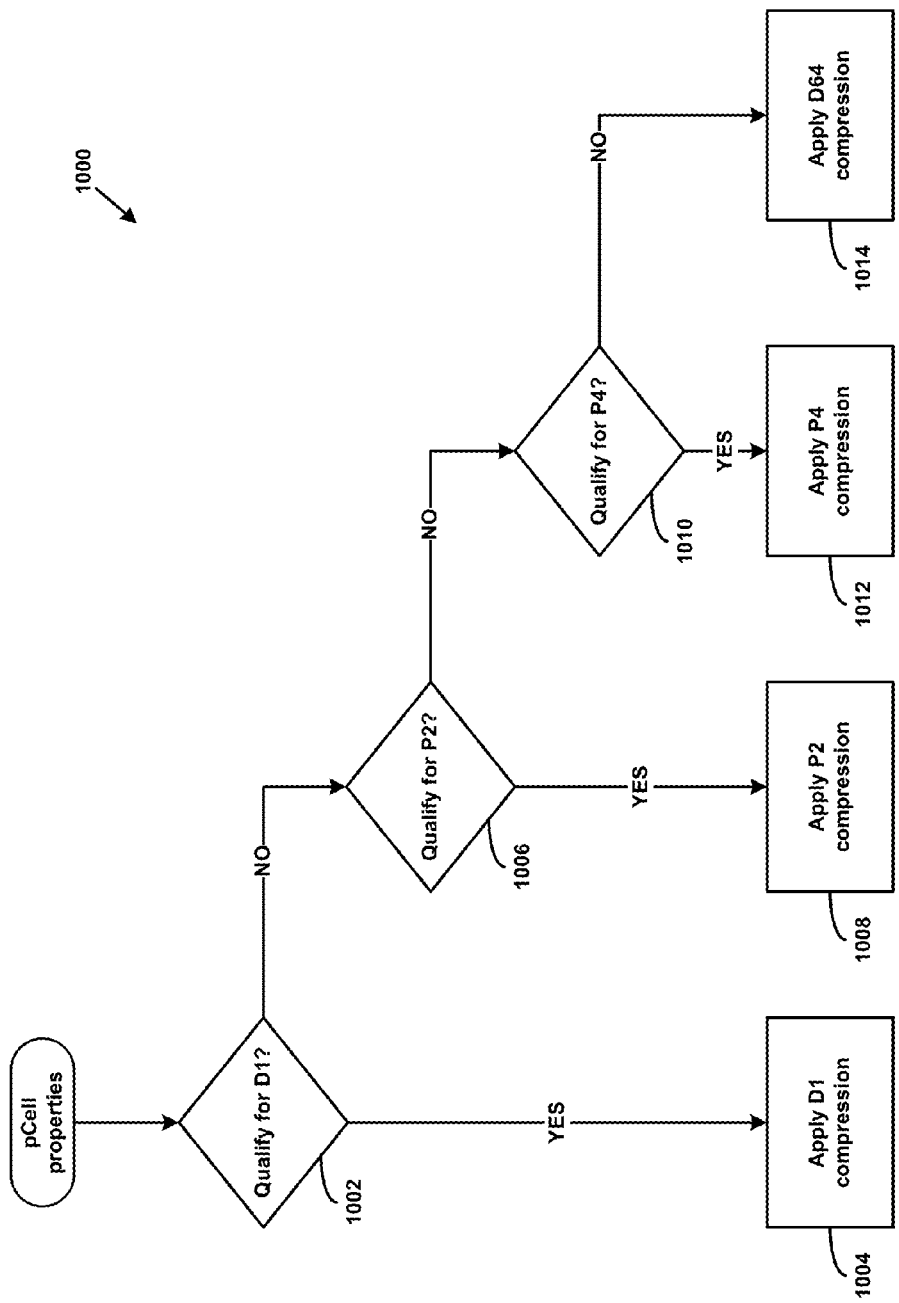
FIG. 10 depicts an attribute plane decision tree, according to example embodiments.

FIG. 10 depicts an attribute plane decision tree 1000, in accordance with example embodiments. This decision tree considers the properties of a pCell of an attribute plane, with that understanding that each element of this attribute plane pCell is associated in a one-to-one fashion with a pixel values of one or more corresponding color plane pCells. The size of these pCells may be 8×8, but other sizes may be used instead. It is also assumed that there is only one attribute plane, so all decisions in decision tree 1000 are made on a planar basis. However, alternative embodiments could take different approaches.

Similar to decision trees 800 and 900, D1D and P2D compression are not referenced explicitly in decision tree 1000. However, wherever D1 or P2 compression are considered or used, D1D and P2D compression may be considered or used as well. Thus, blocks 1002, 1004, 1006, and 1008 may consider and/or use D1D and P2D compression. Runs of consecutive D1 or D1D encodings are also not explicitly considered in decision tree 1000, but may be used regardless.

At block 1002, it is determined whether the attribute plane pCell qualifies for D1 compression (i.e., all attribute arrays in the pCell are identical). If so, D1 compression is applied at block 1004. Otherwise, at block 1006, it is determined whether the pCell qualifies for P2 compression (i.e., all attribute arrays in the pCell have one of two values). If so, P2 compression may be applied at block 1008.

If the pCell does not qualify for either D1 or P2 compression, at block 1010 it may be determined whether the pCell qualifies for P4 compression (i.e., all attribute arrays in the pCell have one of four values). If so, P4 compression may be applied at block 1012. Otherwise, D64 compression may be applied at block 1014.

FIG. 10 depicts one possible attribute plane decision tree. Other such decision trees are possible.

10. Interleaved Encoding

The encoded output of cell-based compression may be interleaved. In some cases, an interleaved encoding may be superior to a non-interleaved encoding.

This interleaving may consider (i) the ordering of pCells and planes across qCells, (ii) whether downsampling is a planar or composite decision, and (iii) compression performance. For the latter consideration, separate DCT compression and pattern (non-DCT) compression processors may be used. It is assumed that the DCT compression processor will run in parallel with the pattern processor, and that the DCT processor may run much slower, perhaps at one-eighth the speed of the pattern processor. Thus, the interleave format may support maintaining high utilization of the DCT processor in various mixes of DCT and pattern pCells.

Based on these considerations, the qCells and pCells of the attribute plane and color planes may be written to an output medium (e.g., storage of block 606 and/or storage of block 616) in an interleaved fashion. As an example, if the color model is YCbCrA, then the ordering of encoded cells may be an attribute cell, then a luminance (Y) cell, then a Cb cell, then a Cr cell, then another attribute cell, then another luminance (Y) cell, then another Cb cell, then another Cr cell, and so on.

Figures 11A, 11B:
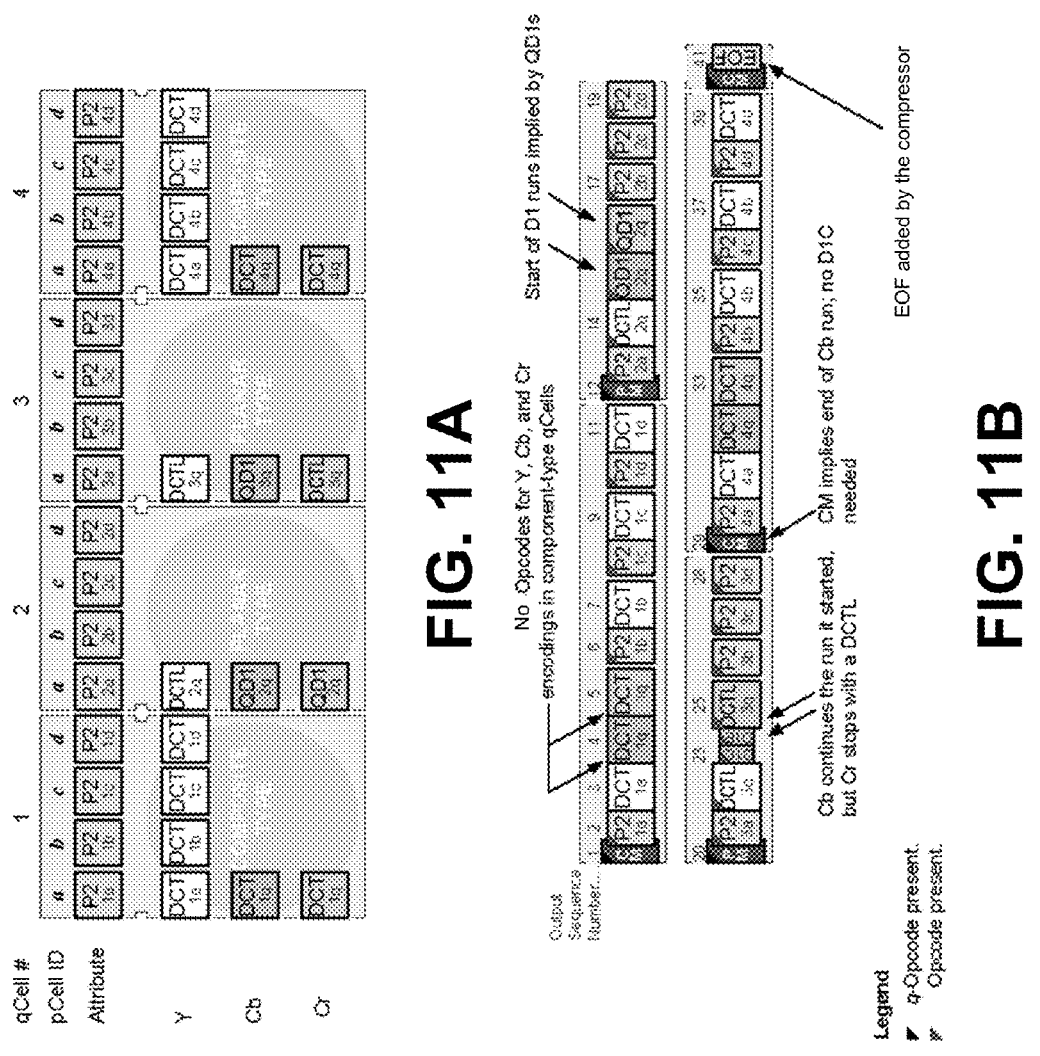

An example of such an interleaving operation is shown in FIGS. 11A and 11B. FIG. 11A depicts a series of four qCells for each of the attribute, Y, Cb, and Cr planes. Each pCell within a qCell is associated with a respective pCell ID (e.g., a, b, c, or d), and depicted as a box. The boxes contain the compression technique used to compress each respective pCell, as well as the qCell number and pCell ID. For example, the first (left-most) pCell of the attribute plane was compressed using P2 compression and is from pCell 1a.

Throughout the four qCells, the attribute plane is consistently encoded using P2 compression, the Y plane is encoded using DCT or DCTL compression, the Cb plane is encoded using DCT (i.e., DCT 4:2:0) or QD1 compression, and the Cr plane is encoded using DCT (i.e., DCT 4:2:0), QD1, or DCTL compression.

FIG. 11B depicts an interleaved encoding of the pCells and qCells of FIG. 11A. Each of the color and attribute planes are interleaved one-by-one-by-one-by-one, except for when a run is encoded in a more efficient fashion. For instance, the encoding begins, in the 1st output position, with an indication that composite mode (CM) is active. This is followed by the pCells of the first qCell. Composite mode is used for the first qCell because it is encoded using DCT 4:2:0.

In the encoding, the first pCell is the 1a pCell of the attribute plane, then the 1a pCell of the Y plane, the 1a pCell of the Cb plane, the 1a pCell of the Cr plane, the 1b pCell of the attribute plane, the 1b pCell of the Y plane, and so on. Note that the opcodes are omitted for Y, Cb, and Cr encodings in composite mode.

For the second qCell, planar mode is entered, at the 12th output position, because the color channels are encoded using DCTL and QD1 compression. Each of the QD1 encodings for the Cb and Cr color channels implicitly begins a QD1 run. Note that opcodes are present for each of the encoded pCells.

For the third qCell, planar mode is also indicated, at the 20th output position, because the color channels are once again encoded using DCTL and QD1 compression. Since the QD1 run in the Cb plane continues, a QD1C encoding is used for that plane. However, the QD1 run does not continue for the Cr plane. Thus, a QD1E encoding is used to indicate the end of the QD1 run, and a DCTL encoding, at the 25th output position, is used to represent the Cr plane pCell.

For the fourth qCell, composite mode is used once again. The composite mode indicator (the CM encoding in the 29th output position) implicitly ends the run of QD1 encodings in the Cb plane. After the encoding of the fourth qCell, another composite mode indicator and then an end-of-file (EOF) are encoded to end this section of the interleaved representation.

Figure 12A:
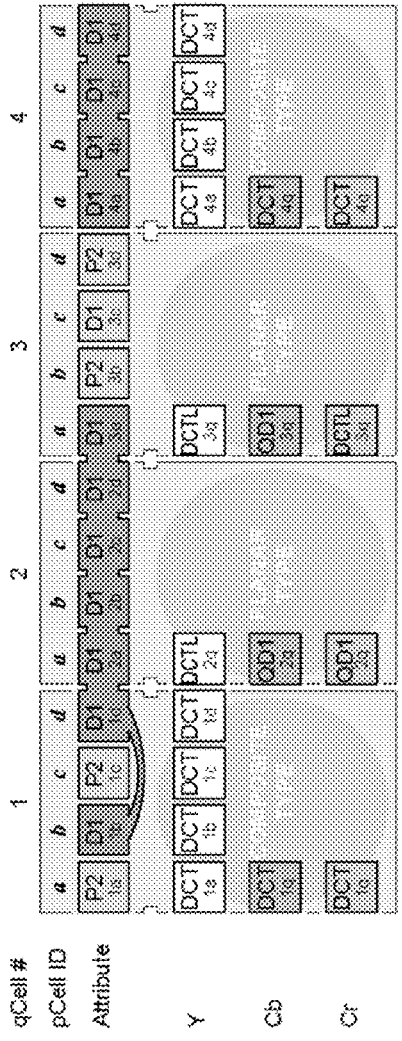
FIG. 12A depicts cells of four planes, according to example embodiments.
Figure 12B:
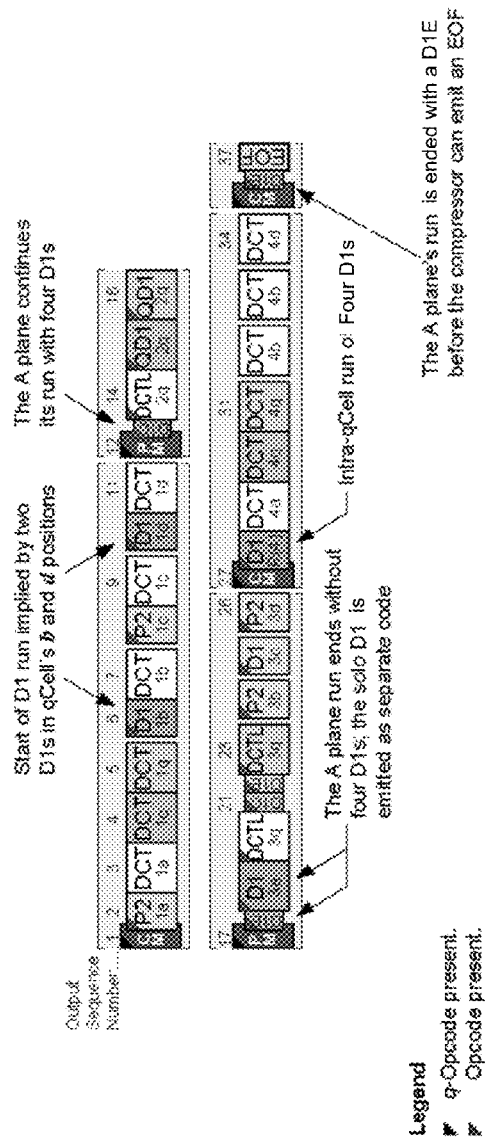
FIG. 12B depicts the cells of FIG. 12A interleaved on an output medium, according to example embodiments.

Another example of an interleaving operation is shown in FIGS. 12A and 12B. FIG. 12A depicts a series of four qCells for each of the attribute, Y, Cb, and Cr planes. However, unlike the example of FIGS. 11A and 11B, the example of FIG. 12A includes a D1 run on the attribute plane.

FIG. 12B depicts an interleaved encoding of the pCells and qCells of FIG. 12A. Each of the color and attribute planes are interleaved one-by-one-by-one-by-one, except for when a run is encoded in a more efficient fashion, In particular, an attribute plane D1 run implicitly begins in the first qCell as represented by the two D1 encodings at the 6th and 10th output positions. The QD1 run on the Cb plane is the same as that of FIGS. 11A and 11B.

In the second qCell, the D1 run is represented by a single D1C encoding at the 13th output position. However, the D1 run ends in the third qCell. Thus, a D1E encoding appears at the 18th output position, indicating the end of the D1 run. Then, the four attribute pCells of the third qCell are encoded individually.

The fourth qCell contains an intra-qCell D1 run. Therefore, these four pCells are represented in a single D1 encoding that indicates a run of four (D1 R(4)) at the 28th output position. Like the example of FIG. 11B, another composite mode indicator and then an end-of-file (EOF) are encoded to end this section of the compressed representation. However, switching from planar mode to composite mode does not implicitly end an attribute plane run in this example. As a result, a D1E encoding appears at the 36th output position in order to perform this function.

FIGS. 11A, 11B, 12A, and 12B are provided for purposes of illustration. Other encodings may be supported by the embodiments herein, and variations may be made to these encodings without departing from the scope of the embodiments.

11. Example Cell-Based Decompression

Once a number of pCells and/or qCells are compressed using, for example, the compression methods and encodings discussed above, they may be efficiently stored and/or transmitted over a cable or network. Nonetheless, at some point, the pCells and/or qCells may be decompressed into the original image or an approximation of the original image. Since the cell-based compression techniques described herein can be lossy, the decompressed image may differ, at least to some extent, from the original image. However, in many scenarios, this difference will either be unlikely to be perceived by a human, or considered to be an acceptable version of the original image.

The pCells and/or qCells encoded with the compression encodings described above can be decoded and decompressed as follows. For a particular qCell encoding, the q-opcode is read to determine whether the qCell is encoded using composite mode or planar mode. Based on this mode, one or more opcodes are read. Based on the value of each opcode, any applicable options, arguments, bitmaps, etc., can be determined from the bits following the opcode. From these parameters, a decompressed version of the pCell or qCell can be reconstructed. Then, the next opcode is read and so on until the image is reconstructed.

a. Attribute Plane Decompression

On the attribute plane, if the opcode is 001, indicating D1 encoding, the V' bit and the arguments field may be read to determine the value of the compressed element. The length bits may also be read to determine whether a run length is present. Then, a number of cells commensurate with the run length are created with all pixels in each cell exhibiting the value indicated by the value field in the encoding, or in a cached version of the value field.

If the opcode is 000, indicating D1D encoding, the V bit may be read to determine the value of the compressed element, and the length bits may be read to determine whether a run length is present. Then, a number of cells commensurate with the run length are created with all pixels in each cell exhibiting the default value indicated by the V bit.

If the opcode is 011, indicating P2 encoding, the options, arguments, and bitmap may be read. If the V' bit is 1, the two values in the cell may be determined. Then, a cell may be created with each pixel taking on one of the two values in accordance with the line map and the bitmap. If the line map is not present, then the line map and bit map from the previous P2 cell are used.

If the opcode is 010, indicating P2D compression, a cell may be created with each pixel taking on one of the two values in accordance with the line map and the bitmap. If the line map is not present, then the line map and bitmap from the previous P2 cell are used.

If the opcode is 100, indicating P4 compression, the line map and values arguments may be read, as well as the bitmap. Then, a cell may be created with each pixel taking on one of the four color values in accordance with the line map and bitmap.

If the opcode is 1, indicating D1C compression, then the most recent D1 or D1D cell is copied. If the opcode is 0, indicating DIE compression, the current D1 or D1D run is considered to have ended.

If the opcode is 11, indicating D64 compression, the number of bits per attribute is determined, and then the attributes field is decoded accordingly. The number of bits per attribute may depend on the type of printing device and where in the pipeline that the decompression is occurring.

b. Color Plane and Grayscale Plane Decompression

Color plane decompression varies based on whether composite mode or planar mode is being used. If planar mode is being used, the decompression also varies based on whether normal mode or run mode is active. Grayscale plane decompression only uses planar mode.

When composite mode is used, a q-opcode of 1 is followed by either a DCT 4:2:0 or a DCT Y encoding, based on whether the image is color or grayscale. When planar mode is used, a q-opcode of 0 is followed by an opcode indicating the type of encoding that appears next.

For instance, in normal mode, a 01 opcode indicates a QD1 encoding, a 00 opcode indicates a QD1D encoding, and a 1 opcode indicates a DCTL encoding. In run mode, a 1 opcode indicates a QD1C encoding, and a 0 opcode indicates a QD1E encoding.

Decompressing a pCell that was compressed using DCT 4:2:0 with intelligent downsampling may involve using the edge bits in the associated attribute arrays. Since the edge bits represent the original (non-downsampled) edge bits, the location of edges in the original image is known. Further, with DCT 4:2:0 compression, the corresponding Y plane value for the pixel (the pixel's luminance) is also known.

When decompressing, a downsampled pCell is upsampled to a qCell. Thus, for example, each pixel in the pCell is upsampled to a 2×2 block of pixels in the qCell. Assume that the value of the downsampled pixel is f. Then each pixel c(x,y), c(x+1,y), c(x,y+1), and c(x+1,y+1) of the 2×2 block is set to f if that pixel represents an edge. The Y plane value of each non-edge pixel is compared to a threshold. If the Y plane value exceeds the threshold, the non-edge pixel is set to 128 (a neutral color), otherwise the non-edge pixel is set to f. If no edges are present, then all four pixels are set to f. The threshold may be any value, for instance, 220 or higher.

In some embodiments, neutral color values other than 128 can be used instead. In general, this technique preserves edges while upsampling because the scanning unit may be configured to only set the edge bit for a pixel when one of the two pixels defining the edge is white or near-white.

12. Example Performance Results

The cell-based compression techniques described herein were compared to two variations of JPEG compression, JPEG Q90 and JPEG Q95. JPEG Q90 and JPEG Q95 refer to common quantization tables used in JPEG for DCT coefficients. JPEG Q90 yields high quality, and JPEG Q95 yields even higher quality. Twenty-six representative and challenging pages were compressed with the cell-based compression techniques described herein, as well as with JPEG Q90 and JPEG Q95. Flat7 quantization tables were used in the cell-based compression techniques for DCT coefficients.

The results of these comparisons are as follows. The cell-based compression techniques yielded better compression ratios than JPEG Q95 for all twenty-six pages. On average, JPEG 95 provided a compression ratio approximately 85% worse than the cell-based compression techniques. Also, the cell-based compression techniques yielded better compression ratios than JPEG 90 for all but five pages. Of these five pages, JPEG 90 provided at most an 8% improvement over the cell-based compression techniques. But, on average, JPEG 90 provided a compression ratio approximately 19% worse than the cell-based compression techniques.

Significantly, the cell-based compression techniques produced subjectively better image quality than both JPEG settings.

13. Example Operations

Figure 13:
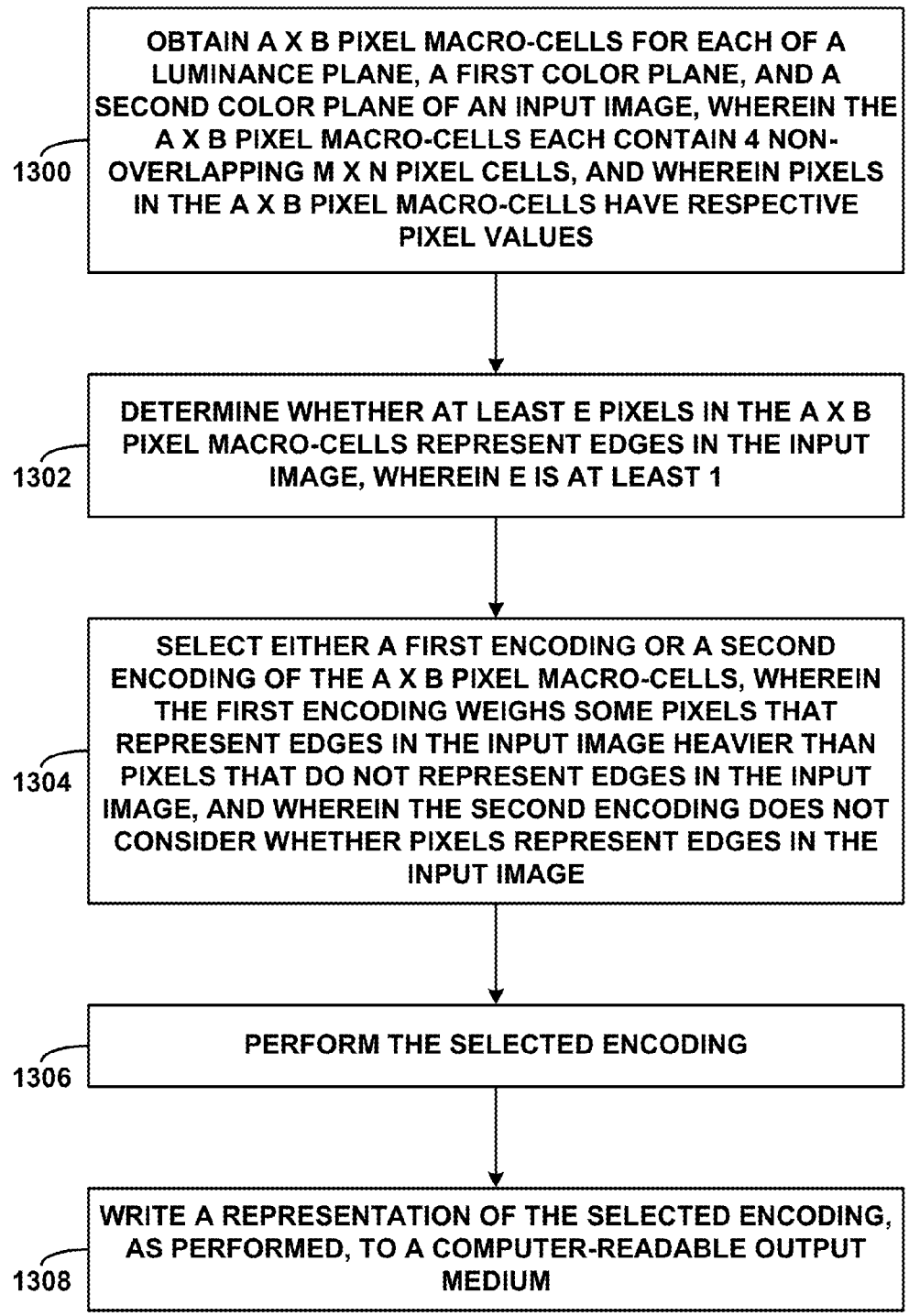
FIG. 13 is a flow chart, according to example embodiments.
Figure 14:
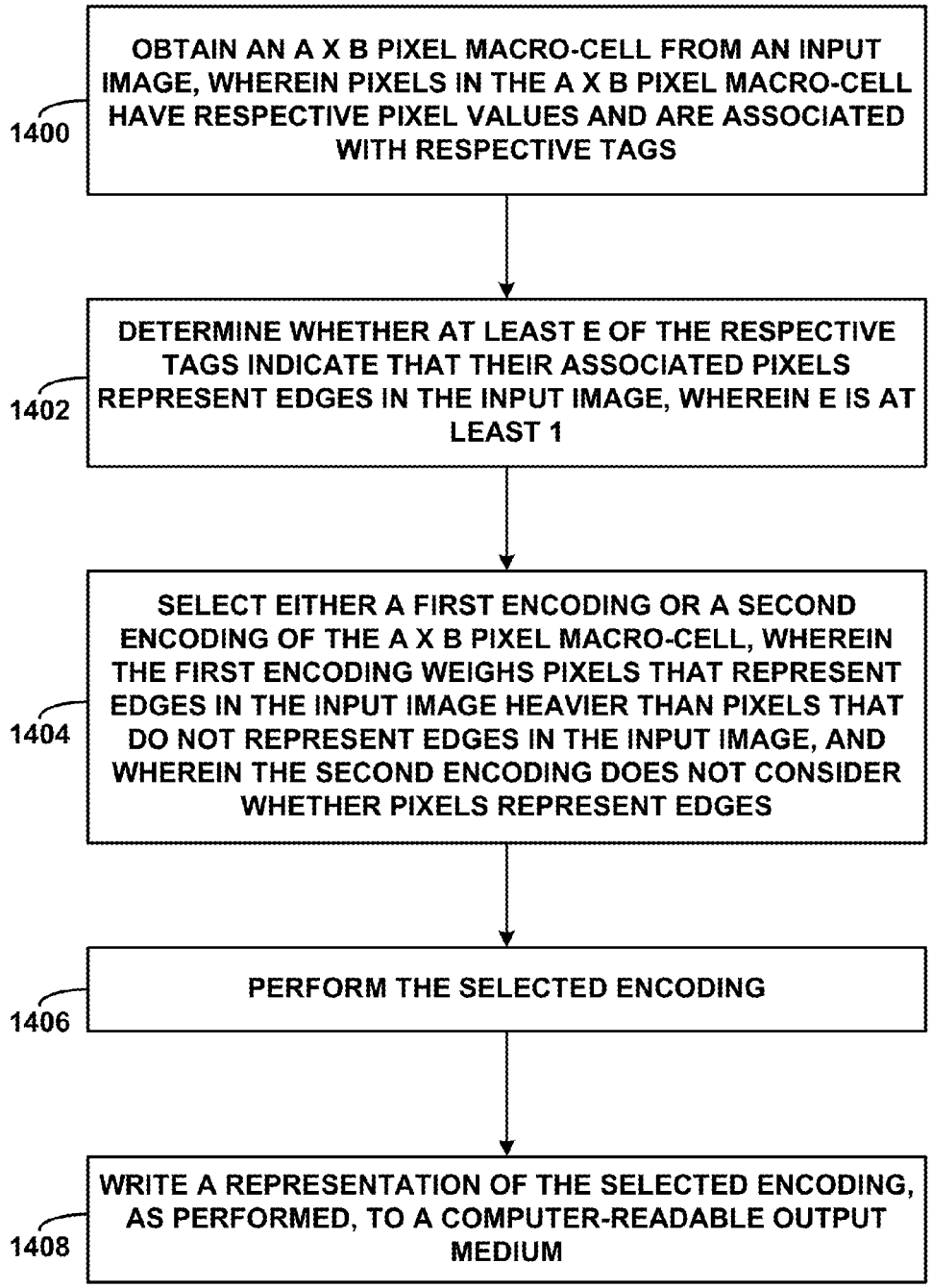
FIG. 14 is another flow chart, according to example embodiments.
Figure 15:
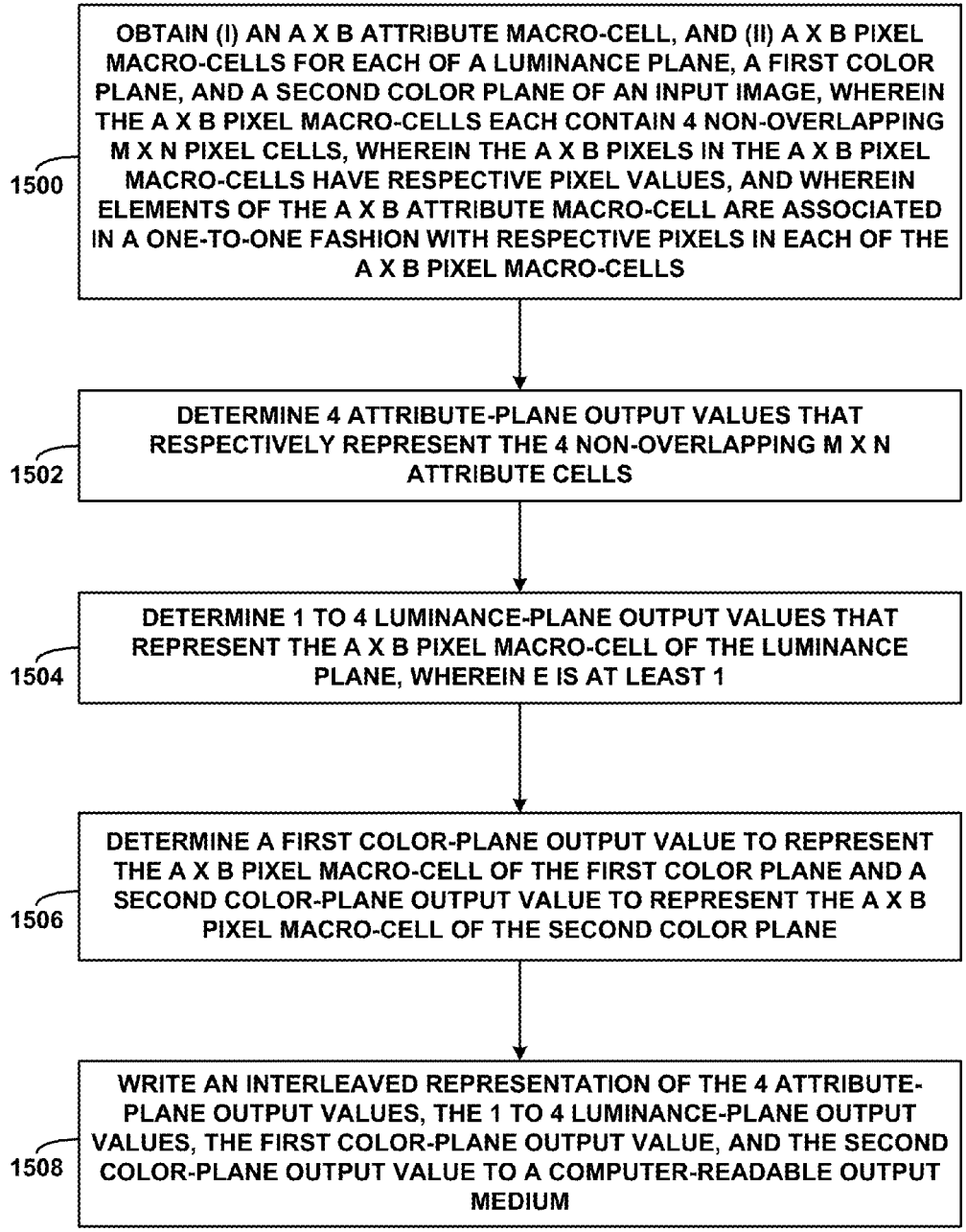
FIG. 15 is yet another flow chart, according to example embodiments.

FIGS. 13, 14, and 15 are flow charts of example embodiments. The steps illustrated by these flow charts may be carried out by one or more printing devices, such as printing device 100, and/or computing devices, such as computing device 300. Further, aspects of each individual step may be distributed between multiple computing or printing devices.

With respect to the terms used herein, an m×n attribute cell may refer to a planar pCell of the attribute plane, and an m×n pixel cell may refer to a planar pCell of a color plane. Further, an a×b attribute cell may refer to a planar qCell of the attribute plane, and an a×b pixel cell may refer to a planar qCell of a color plane. It is assumed throughout that a is greater than m and b is greater than n.

FIG. 13 generally depicts steps for cell-based compression of color planes of an input image. However, these steps may be used for additional purposes as well. Operations discussed in reference to FIGS. 5-12B may be explicitly or implicitly referenced in this flow chart. For instance, the steps of FIG. 13 could take place at block 604 of FIG. 6, in other locations of a printing device's pipeline, or by a host computer.

At step 1300, a×b pixel macro-cells for each of a luminance plane, a first color plane, and a second color plane of an input image may be obtained. The a×b pixel macro-cells may each contain 4 non-overlapping m×n pixel cells, and pixels in the a×b pixel macro-cells may have respective pixel values.

At step 1302, it may be determined whether at least e pixels in the a×b pixel macro-cells represent edges in the input image. The value of e may be at least 1.

At step 1304, possibly based on whether at least e pixels in the a×b pixel macro-cells represent edges in the input image, either a first encoding or a second encoding of the a×b pixel macro-cells may be selected. The first encoding may weigh some pixels that represent edges in the input image heavier than pixels that do not represent edges in the input image, and the second encoding might not consider whether pixels represent edges in the input image.

At step 1306 the selected encoding may be performed. At step 1308, a representation of the selected encoding, as performed, may be written to a computer-readable output medium.

The first and second encodings may be compressed encodings. Therefore, further steps may involve decompressing the representation of the selected encoding of the a×b pixel macro-cells and printing the input image, including the a×b pixel macro-cells as decompressed.

The first encoding may be the selected encoding. In such embodiments, performing the selected encoding may involve downsampling blocks of pixels in the a×b pixel macro-cells of the first color plane and the second color plane to form a first downsampled m×n pixel cell for the first color plane and a second downsampled m×n pixel cell for the second color plane. The downsampling may weigh pixels that represent edges in the input image heavier than pixels that do not represent edges in the input image (e.g., using intelligent downsampling). Performing the selected encoding may further involve encoding a transform of the 4 non-overlapping m×n pixel cells of the luminance plane, the first downsampled m×n pixel cell, and the second downsampled m×n pixel cell. The transforms may be based on discrete cosine transforms, such as DCT 4:2:0.

Alternatively, the second encoding may be the selected encoding. In such embodiments, performing the selected encoding may involve (i) determining that a range of pixel values in at least one of the 4 non-overlapping m×n pixel cells from any of the a×b pixel macro-cells is greater than a threshold value, (ii) downsampling blocks of pixels in the a×b pixel macro-cells of the first color plane and the second color plane to form a first downsampled m×n pixel cell for the first color plane and a second downsampled m×n pixel cell for the second color plane, and (iii) encoding transforms of the 4 non-overlapping m×n pixel cells of the luminance plane, the first downsampled m×n pixel cell and the second downsampled m×n pixel cell. The downsampling might not consider whether pixels represent edges in the input image. The transforms may be based on discrete cosine transforms, such as DCT 4:2:0.

In yet another alternative, the second encoding may be the selected encoding, and performing the selected encoding may involve (i) determining that ranges of pixel values in each of the 4 non-overlapping m×n pixel cells for each of the a×b pixel macro-cells are less than or equal to a threshold value, (ii) determining respective average pixel values for each of the 4 non-overlapping m×n pixel cells for a particular one of the a×b pixel macro-cells, (iii) determining that either (a) at least one of the ranges of pixel values is greater than a cell-level threshold value, or (b) a range of the respective average pixel values is greater than or equal to a macro-cell-level threshold value, (iv) downsampling blocks of pixels in the particular one of the a×b pixel macro-cells to a downsampled m×n pixel cell, and (v) encoding a transform of the downsampled m×n pixel cell (e.g., using DCTL compression). The downsampling might not consider whether pixels in the particular one of the a×b pixel macro-cells represent edges in the input image. The threshold value may be greater than both of the cell-level threshold value and the macro-cell-level threshold value.

In still another alternative, the second encoding may be the selected encoding, and performing the selected encoding may involve (i) determining respective average pixel values for each of the 4 non-overlapping m×n pixel cells for a particular one of the a×b pixel macro-cells, (ii) determining that ranges of pixel values in each of the 4 non-overlapping m×n pixel cells for the particular one of the a×b pixel macro-cells are all less than or equal to a cell-level threshold value, (iii) determining that the ranges of the respective average pixel values are less than a macro-cell-level threshold value, and (iv) encoding the particular one of the a×b pixel macro-cells with a single pixel value (e.g., using QD1 compression).

FIG. 14 generally depicts steps for cell-based compression of a color plane. However, these steps may be used for additional purposes as well. Operations discussed in reference to FIGS. 5-12B may be explicitly or implicitly referenced in this flow chart. For instance, the steps of FIG. 14 could take place at block 604 of FIG. 6, in other locations of a printing device's pipeline, or by a host computer.

At step 1400, an a×b pixel macro-cell from an input image may be obtained. Pixels in the a×b pixel macro-cell may have respective pixel values, and may be associated with respective tags. These tags might be edge bits in respectively associated attribute arrays.

At step 1402, it may be determined whether at least e of the respective tags indicate that their associated pixels represent edges in the input image. The value of e may be at least 1.

At step 1404, possibly based on whether at least e of the respective tags indicate that their associated pixels represent edges in the input image, either a first encoding or a second encoding of the a×b pixel macro-cell may be selected. The first encoding may weigh pixels that represent edges in the input image heavier than pixels that do not represent edges in the input image. The second encoding might not consider whether pixels represent edges.

At step 1406, the selected encoding may be performed. At step 1408, a representation of the selected encoding, as performed, may be written to a computer-readable output medium.

In some embodiments, the first encoding may be the selected encoding, and performing the selected encoding may involve (i) based on the tags, determining that a first 2×2 block of pixels in the a×b pixel macro-cell contains g pixels representing edges in the input image, and encoding a first pixel in a downsampled m×n pixel cell with an average value of the g pixels (e.g., DCT 4:2:0 compression with intelligent downsampling). The value of g may be 1, 2, or 3. In these embodiments, performing the selected encoding may further involve (i) based on the tags, determining that a second 2×2 block of pixels in the a×b pixel macro-cell contains no pixels representing edges in the input image, and encoding a second pixel in the downsampled m×n pixel cell with an average value of all pixels in the second 2×2 block of pixels. The average value of all pixels might not consider whether pixels represent edges.

In alternative embodiments, the a×b pixel macro-cell may contain 4 non-overlapping m×n pixel cells. The second encoding may be the selected encoding, and performing the selected encoding may involve (i) determining that a range of pixel values in at least one of the 4 non-overlapping m×n pixel cells exceeds a predetermined non-zero threshold value, and (ii) encoding a particular pixel in a downsampled m×n pixel cell with an average value of all pixels in a particular 2×2 block of pixels in the a×b pixel macro-cell (e.g., DCT 4:2:0 compression without intelligent downsampling). The average value of all pixels might not consider whether pixels represent edges.

In further embodiments, the a×b pixel macro-cell may also contain 4 non-overlapping m×n pixel cells. The second encoding may be the selected encoding, and performing the selected encoding may involve (i) determining that ranges of pixel values in each of the 4 non-overlapping m×n pixel cells are less than or equal to a threshold value, (ii) determining respective average pixel values for each of the 4 non-overlapping m×n pixel cells, (iii) determining that either (a) at least one of the ranges of pixel values is greater than a cell-level threshold value, or (b) a range of the respective average pixel values is greater than or equal to a macro-cell-level threshold value, (iv) downsampling blocks of pixels in the a×b pixel macro-cell to a downsampled m×n pixel cell, and (v) encoding a transform of the downsampled m×n pixel cell (e.g., using DCTL compression). The threshold value may be greater than both of the cell-level threshold value and the macro-cell-level threshold value. The downsampling might not consider whether pixels in the a×b pixel macro-cells represent edges in the input image.

In additional embodiments, the a×b pixel macro-cell may also contain 4 non-overlapping m×n pixel cells. The second encoding may be the selected encoding, and performing the selected encoding may involve (i) determining respective average pixel values for each of the 4 non-overlapping m×n pixel cells, (ii) determining that ranges of pixel values in each of the 4 non-overlapping m×n pixel cells are all less than or equal to a cell-level threshold value, (iii) determining that the ranges of the respective average pixel values are less than a macro-cell-level threshold value, and (iv) encoding the a×b pixel macro-cell with a single pixel value (e.g., using QD1 compression).

FIG. 15 generally depicts steps for interleaving compressed representations of cells from an attribute plane and one or more color planes. However, these steps may be used for additional purposes as well. Operations discussed in reference to FIGS. 5-12B may be explicitly or implicitly referenced in this flow chart. For instance, the steps of FIG. 15 could take place at block 604 of FIG. 6, in other locations of a printing device's pipeline, or by a host computer.

At step 1500, (i) an a×b attribute macro-cell, and (ii) a×b pixel macro-cells for each of a luminance plane, a first color plane, and a second color plane of an input image may be obtained. The a×b pixel macro-cells may each contain 4 non-overlapping m×n pixel cells. The a×b pixels in the a×b pixel macro-cells may have respective pixel values, and elements of the a×b attribute macro-cell may be associated in a one-to-one fashion with respective pixels in each of the a×b pixel macro-cells.

At step 1502, 4 attribute-plane output values that respectively represent the 4 non-overlapping m×n attribute cells may be determined. At step 1504, possibly based at least partially on whether the a×b attribute macro-cell indicates that at least e pixels in the a×b pixel macro-cells represent edges in the input image, 1 to 4 luminance-plane output values that represent the a×b pixel macro-cell of the luminance plane may be determined. The value of e may be at least 1.

At step 1506, a first color-plane output value to represent the a×b pixel macro-cell of the first color plane and a second color-plane output value to represent the a×b pixel macro-cell of the second color plane may be determined. At step 1508, an interleaved representation of the 4 attribute-plane output values, the 1 to 4 luminance-plane output values, the first color-plane output value, and the second color-plane output value may be written to a computer-readable output medium. The first color-plane output value may be represented in less than a×b bytes, and the second color-plane output value may be represented in less than a×b bytes.

In some embodiments, determining the 1 to 4 luminance-plane output values may involve (i) determining that the a×b attribute macro-cell indicates that at least e pixels in the a×b pixel macro-cells represent edges in the input image, and (ii) determining 4 luminance-plane output values that respectively represent each of the non-overlapping m×n pixel cells in the a×b pixel macro-cell of the luminance plane. The first color-plane output value and the second color-plane output value may be downsampled versions of the a×b pixel macro-cell of the first color plane and of the second color plane, respectively, that weigh pixels representing edges in the input image heavier than pixels that do not represent edges in the input image.

Alternatively, determining the 1 to 4 luminance-plane output values may involve (i) determining that (a) the a×b attribute macro-cell indicates that less than e pixels in the a×b pixel macro-cells represent edges in the input image, and (b) a range of pixel values in at least one of the 4 non-overlapping m×n pixel cells of the a×b pixel macro-cells is greater than a threshold value, and (ii) determining 4 luminance-plane output values that respectively represent each of the non-overlapping m×n pixel cells in the a×b pixel macro-cell of the luminance plane. The first color-plane output value and the second color-plane output value may be downsampled versions of the a×b pixel macro-cell of the first color plane and of the second color plane, respectively, and wherein the downsampling does not consider whether pixels represent edges in the input image.

In other embodiments, determining the 1 to 4 luminance-plane output values may involve (i) determining that (a) the a×b attribute macro-cell indicates that less than e pixels in the a×b pixel macro-cells represent edges in the input image, and (b) ranges of pixel values in each of the 4 non-overlapping m×n pixel cells for each of the a×b pixel macro-cells are less than or equal to a threshold value, and (ii) determining 1 luminance-plane output value that represents the a×b pixel macro-cell of the luminance plane.

Alternatively or additionally, when 4 luminance-plane output values are determined, the interleaved representation may be prefaced by a composite mode indicator, and opcodes may be omitted for each of the 1 to 4 luminance-plane output values, the first color-plane output value, and the second color-plane output value in the interleaved representation. On the other hand, when 1 luminance-plane output value is determined, and the interleaved representation may be prefaced by a planar mode indicator, and opcodes may be included for each of the 1 to 4 luminance-plane output values, the first color-plane output value, and the second color-plane output value in the interleaved representation.

In some cases, the first color-plane output value may indicate the continuation or the ending of a run of identical output values for the first color plane. Similarly, the second color-plane output value may indicate the continuation or the ending of a run of identical output values for the second color plane.

14. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A method comprising:
obtaining, by a printing device, a×b pixel macro-cells for each of a luminance plane, a first color plane, and a second color plane of an input image, wherein the a×b pixel macro-cells each contain 4 non-overlapping m×n pixel cells, and wherein pixels in the a×b pixel macro-cells have respective pixel values;
determining, by a processor of the printing device, whether at least e pixels in the a×b pixel macro-cells represent edges in the input image, wherein e is at least 1;
based on whether at least e pixels in the a×b pixel macro-cells represent edges in the input image, selecting, by the processor of the printing device, either a first encoding or a second encoding of the a×b pixel macro-cells, wherein the first encoding weighs some pixels that represent edges in the input image heavier than pixels that do not represent edges in the input image, wherein the second encoding does not consider whether pixels represent edges in the input image, and wherein the first encoding is the selected encoding;
performing, by the processor of the printing device, the selected encoding, wherein performing the selected encoding comprises (i) downsampling blocks of pixels in the a×b pixel macro-cells of the first color plane and the second color plane to form a first downsampled m×n pixel cell for the first color plane and a second downsampled m×n pixel cell for the second color plane, wherein the downsampling weighs pixels that represent edges in the input image heavier than pixels that do not represent edges in the input image, and (ii) encoding a transform of the 4 non-overlapping m×n pixel cells of the luminance plane, the first downsampled m×n pixel cell, and the second downsampled m×n pixel cell; and writing, by the processor of the printing device, a representation of the selected encoding, as performed, to a computer-readable output medium.

2. The method of claim 1, wherein the first and second encodings are compressed encodings.

3. The method of claim 2, further comprising:
decompressing the representation of the selected encoding of the a×b pixel macro-cells; and
printing the input image, including the a×b pixel macro-cells as decompressed.

4. The method of claim 1, wherein the transforms are based on discrete cosine transforms.

5. A method comprising:
obtaining, by a printing device, an a×b pixel macro-cell from an input image, wherein pixels in the a×b pixel macro-cell have respective pixel values and are associated with respective tags;
determining, by a processor of the printing device, whether at least e of the respective tags indicate that their associated pixels represent edges in the input image, wherein e is at least 1;
based on whether at least e of the respective tags indicate that their associated pixels represent edges in the input image, selecting, by the processor of the printing device, either a first encoding or a second encoding of the a×b pixel macro-cell, wherein the first encoding weighs pixels that represent edges in the input image heavier than pixels that do not represent edges in the input image, wherein the second encoding does not consider whether pixels represent edges, and wherein the first encoding is the selected encoding;
performing, by the processor of the printing device, the selected encoding, wherein performing the selected encoding comprises (i) based on the tags, determining that a first 2×2 block of pixels in the a×b pixel macro-cell contains g pixels representing edges in the input image, wherein g is 1, 2, or 3, and (ii) encoding a first pixel in a downsampled m×n pixel cell with an average value of the g pixels; and
writing, by the processor of the printing device, a representation of the selected encoding, as performed, to a computer-readable output medium.

6. The method of claim 5, wherein performing the selected encoding further comprises:

based on the tags, determining that a second 2×2 block of pixels in the a×b pixel macro-cell contains no pixels representing edges in the input image; and
encoding a second pixel in the downsampled m×n pixel cell with an average value of all pixels in the second 2×2 block of pixels, wherein the average value of all pixels does not consider whether pixels represent edges.

7. A method comprising:
obtaining, by a printing device, a×b pixel macro-cells for each of a luminance plane, a first color plane, and a second color plane of an input image, wherein the a×b pixel macro-cells each contain 4 non-overlapping m×n pixel cells, and wherein pixels in the a×b pixel macro-cells have respective pixel values;
determining, by a processor of the printing device, whether at least e pixels in the a×b pixel macro-cells represent edges in the input image, wherein e is at least 1;
based on whether at least e pixels in the a×b pixel macro-cells represent edges in the input image, selecting, by the processor of the printing device, either a first encoding or a second encoding of the a×b pixel macro-cells, wherein the first encoding weighs some pixels that represent edges in the input image heavier than pixels that do not represent edges in the input image, wherein the second encoding does not consider whether pixels represent edges in the input image, and wherein the second encoding is the selected encoding;
performing, by the processor of the printing device, the selected encoding, wherein performing the selected encoding comprises (i) determining that a range of pixel values in at least one of the 4 non-overlapping m×n pixel cells from any of the a×b pixel macro-cells is greater than a threshold value, (ii) downsampling blocks of pixels in the a×b pixel macro-cells of the first color plane and the second color plane to form a first downsampled m×n pixel cell for the first color plane and a second downsampled m×n pixel cell for the second color plane, wherein the downsampling does not consider whether pixels represent edges in the input image, and (iii) encoding a transform of the 4 non-overlapping m×n pixel cells of the luminance plane, the first downsampled m×n pixel cell and the second downsampled m×n pixel cell; and
writing, by the processor of the printing device, a representation of the selected encoding, as performed, to a computer-readable output medium.

8. The method of claim 7, wherein the first and second encodings are compressed encodings.

9. The method of claim 8, further comprising:
decompressing the representation of the selected encoding of the a×b pixel macro-cells; and
printing the input image, including the a×b pixel macro-cells as decompressed.

* * * * *